(12) United States Patent
Burghoff et al.

(10) Patent No.: US 10,126,170 B2
(45) Date of Patent: Nov. 13, 2018

(54) COMPUTATIONALLY-ASSISTED MULTI-HETERODYNE SPECTROSCOPY

(71) Applicant: Massachusetts Institute of Technology, Cambridge, MA (US)

(72) Inventors: David Burghoff, Cambridge, MA (US); Yang Yang, Cambridge, MA (US); Qing Hu, Wellesley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 64 days.

(21) Appl. No.: 15/259,687

(22) Filed: Sep. 8, 2016

(65) Prior Publication Data

US 2017/0138791 A1  May 18, 2017

Related U.S. Application Data

(60) Provisional application No. 62/216,417, filed on Sep. 10, 2015.

(51) Int. Cl.
*G01J 3/28* (2006.01)
*G01J 3/10* (2006.01)

(52) U.S. Cl.
CPC . *G01J 3/28* (2013.01); *G01J 3/10* (2013.01); *G01J 3/108* (2013.01); *G01J 3/2803* (2013.01);
(Continued)

(58) Field of Classification Search
CPC ...... G01J 3/28; G01J 3/10; G01J 3/108; G01J 3/2803; G01J 2003/102; G01J 2003/284;
(Continued)

(56) References Cited

U.S. PATENT DOCUMENTS

2017/0201328 A1* 7/2017 Hugi ...................... H04B 10/64

OTHER PUBLICATIONS

Villares, et al., Dual-comb spectroscopy based on quantum-cascade-laser frequency combs. Nat Commun. Oct. 13, 2014;5:5192; pp. 1-9.
(Continued)

*Primary Examiner* — Ted Wang
(74) *Attorney, Agent, or Firm* — Thomas J. Engellenner; Reza Mollaaghababa; Pepper Hamilton LLP

(57) ABSTRACT

According to one aspect, a multi-heterodyne system is disclosed, which comprises a first laser source for generating multi-mode radiation having a frequency spectrum characterized by a first plurality of phase coherent frequencies, and a second laser source for generating multi-mode radiation having a frequency spectrum characterized by a second plurality of phase coherent frequencies. The system further comprises at least one detector for detecting a combination of the multi-mode radiation generated by the first and second laser sources so as to provide a multi-heterodyne signal having a frequency spectrum characterized by a plurality of beat frequencies, each beat frequency corresponding to a pairwise difference in the first and second plurality of phase coherent frequencies. The system further comprises an analyzer for receiving said multi-heterodyne signal and configured to employ a predictive model of the multi-heterodyne signal to provide estimates of any of phase error and timing error associated with the beat frequencies.

35 Claims, 16 Drawing Sheets

(52) U.S. Cl.
CPC ... *G01J 2003/102* (2013.01); *G01J 2003/284* (2013.01)

(58) Field of Classification Search
CPC ........ H04B 10/64; H04B 10/60; H04B 10/61; H04B 10/614; G02F 2/002
See application file for complete search history.

(56) References Cited

OTHER PUBLICATIONS

Burghoff, et al., Terahertz laser frequency combs. Nature Photonics. Jun. 11, 2014;8;462-467.
The International Search Report and Written Opinion for PCT/US2016/050744, dated Dec. 5, 2016; 12 pages.

* cited by examiner

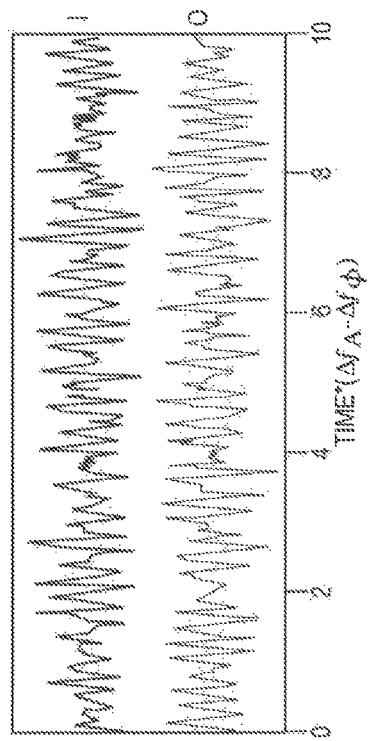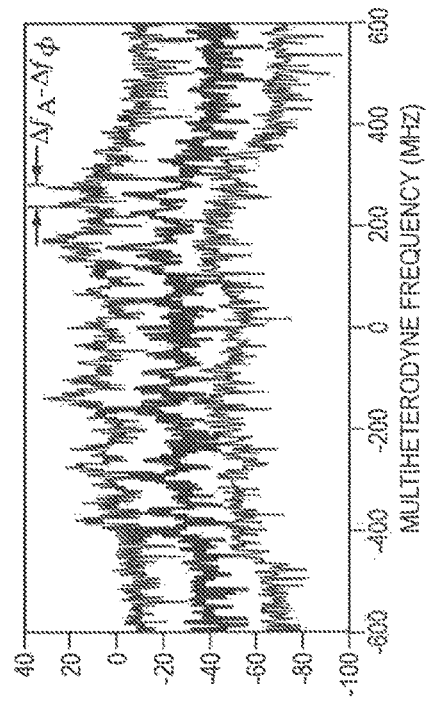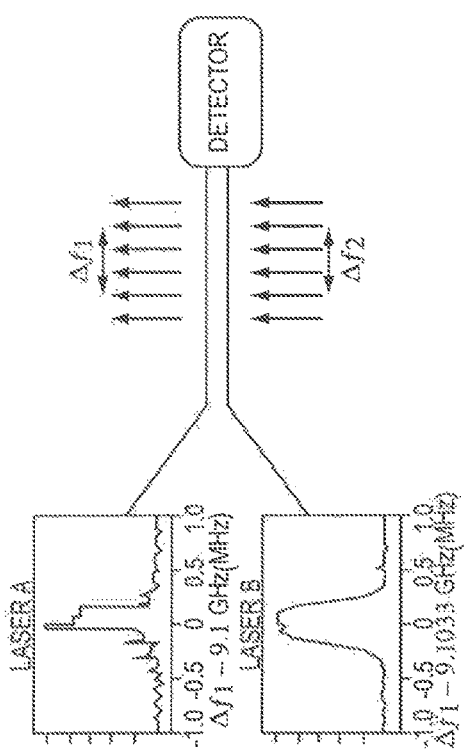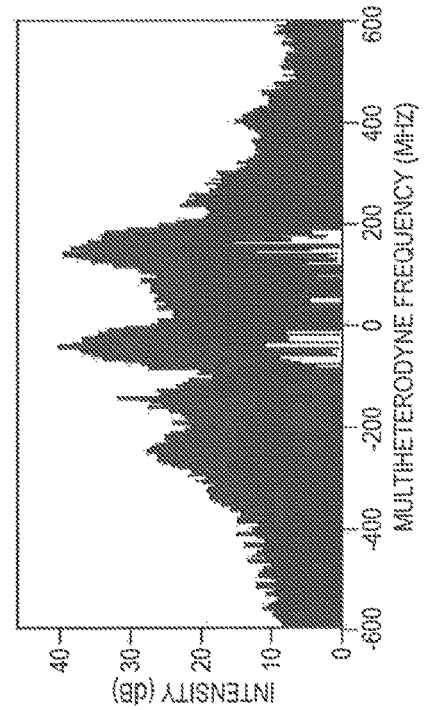
FIG. 11A
FIG. 11B
FIG. 11C
FIG. 11D

COMPUTATIONALLY-ASSISTED MULTI-HETERODYNE SPECTROSCOPY

RELATED APPLICATION

The present application claims priority to provisional application No. 62/216,417 filed on Sep. 10, 2015, which is herein incorporated by reference in its entirety.

GOVERNMENT SUPPORT

The invention was made with government support under NSF grant no. 1505733 and DARPA contract no. W31P4Q-15-1-0009. Government has rights in this invention.

BACKGROUND

The present invention relates generally to multi-heterodyne methods and systems, and more particularly to methods and systems for correcting phase and timing errors in multi-heterodyne signals.

A frequency comb is a broadband coherent source whose frequency spectrum can be fully described by two frequencies, namely, the offset and the repetition rate. Optical combs have found a variety of applications, e.g., in high precision metrology and spectroscopy. For example, in the terahertz frequency regime, combs generated by pulsed lasers can be useful sources of radiation for detecting molecular fingerprints, because many molecules have strong rotational and vibrational resonances in this frequency regime. Further, multi-heterodyne spectroscopy based on two frequency combs, which is also known as dual-comb spectroscopy, allows performing broadband spectroscopy with a broad spectral coverage, a high frequency resolution, and high signal-to-noise ratios. In dual-comb spectroscopy, two frequency combs are directed onto a common detector, and the heterodyne beating between different pairs of lines is detected.

The implementation of dual-comb spectroscopy can be, however, challenging because the carrier-phase drift of the combs can preclude coherent averaging. If the drift is known, its effect can be corrected. But measuring the absolute frequency of a comb line can be challenging. One approach for measuring the carrier-envelope offset (CEO) of a comb is to beat the comb with a stable continuous-wave (CW) laser. Another approach is to use a narrowband optical filter, such as a Bragg grating, to select only a portion of a comb's optical spectrum, and to extract the dual comb beating of different portions of the spectrum. Yet, another approach is to measure the CEO directly using a so-called f-2f technique. These conventional approaches, however, suffer from a number of shortcomings. In particular, they can require the use of additional lasers and optical components, or can impose certain requirements on the comb.

Moreover, performing dual-comb spectroscopy based on combs generated by quantum cascade lasers presents additional challenges. For example, the use of reference channels in long wavelengths for phase and timing correction can require additional cryogenically cooled optical detectors. In addition, the lasers themselves are typically cryogenically cooled in the long wavelength regime, and particularly in the terahertz (THz) regime. Thus, the use of additional CW lasers in reference channels can greatly increase the cost and complexity of a multi-heterodyne system.

Accordingly, there is a need for improved multi-heterodyne methods and systems, and more particularly, there is a need for improved methods and systems for processing multi-heterodyne signals.

SUMMARY

According to one aspect, a multi-heterodyne system is disclosed, which comprises a first laser source for generating multi-mode radiation having a frequency spectrum characterized by a first plurality of phase coherent frequencies, and a second laser source for generating multi-mode radiation having a frequency spectrum characterized by a second plurality of phase coherent frequencies. The system further comprises at least one detector for detecting a combination of the multi-mode radiation generated by the first and second laser sources so as to provide a multi-heterodyne signal having a frequency spectrum characterized by a plurality of beat frequencies, each beat frequency corresponding to a pairwise difference in the first and second plurality of phase coherent frequencies. The system further comprises an analyzer for receiving said multi-heterodyne signal and configured to employ a predictive model of the multi-heterodyne signal to provide estimates of any of phase error and timing error associated with the beat frequencies.

In some embodiments, the analyzer can correct any of the phase error and timing error of the detected multi-heterodyne signal based on the estimates so as to generate a corrected multi-heterodyne signal. In some embodiments, the analyzer can further be configured to minimize an error function associated with a difference between the detected and the predicted multi-heterodyne signal to provide the estimated phase and timing errors. In various embodiments, the any of an extended Kalman filter, an unscented Kalman filter, and a particle filter can be used to minimize the error function.

In one example, the predictive model of the multi-heterodyne signal (y(t)) may be defined as:

$$y(t) = \sum_n A_n e^{i(\varphi_0 + n\Delta\varphi)} = \sum_n r_n e^{i\varphi_n} e^{i(\varphi_0 + n\Delta\varphi)}$$

wherein, $A_n$ denotes a complex amplitude associated with $n^{th}$ beat frequency characterized by a real amplitude $r_n$ and a phase $\varphi_n$, $\varphi_0$ denotes frequency offset phase between the multimode radiation from said first and second lasers and is defined as follows:

$$f_0 = \frac{1}{2\pi} \frac{d\varphi_0}{dt},$$

where $f_0$ denotes a time-dependent frequency offset between two lowest frequencies of the first and second plurality of frequencies, $\Delta\varphi$ denotes repetition rate phase and is defined as follows:

$$\Delta f = \frac{1}{2\pi} \frac{d\Delta\varphi}{dt},$$

where $\Delta f$ denotes said repetition rate of said beat frequencies.

In one example, the error function may be defined as:

$$J(x) = \sum_k \|y_k - h(x_k)\|_{R^{-1}}^2 + \|x_k - f(x_{k-1})\|_{Q^{-1}}^2$$

wherein,
- $x_k$ denotes a state of the system at time k,
- $y_k$ denotes measurement of the multi-heterodyne signal at time k,
- $h(x_k)$ denotes measurement function $h(x)$ evaluated at state $x_k$ as follows:
- $h(x_k) = \sum_n A_{nk} e^{i(\varphi_{0k} + n\Delta\varphi_k)} = \sum_n r_{nk} e^{i\varphi_{nk}} e^{i(\varphi_{0k} + n\Delta\varphi_k)}$, wherein $A_{nk}, r_{nk}, \varphi_{nk}, \varphi_{0k}, \Delta\varphi_k$ denote, respectively, $A_n, r_n, \varphi_n, \varphi_0$, and $\Delta\varphi$ evaluated at time k,
- $f(x_k)$ denotes time evolution function $f(x)$ evaluated at state $x_k$ such that:

$$r_{n(k+1)} = r_{nk}$$

$$\varphi_{n(k+1)} = \varphi_{nk}$$

$$\varphi_{0(k+1)} = \varphi_{0k} + 2\pi\Delta t\, f_{0k}$$

$$\Delta\varphi_{k+1} = \Delta\varphi_k + 2\pi\Delta t\, \Delta f_k$$

wherein $r_{n(k+1)}, \varphi_{n(k+1)}, \varphi_{0(k+1)},$ and $\Delta\varphi_{k+1}$ denote, respectively, $r_n, \varphi_n, \varphi_0,$ and $\Delta\varphi$ evaluated at time k+1, R is said measurement noise covariance, Q is said process noise covariance, such as noise associated with the radiation sources, e.g., amplitude and phase noise.

In some embodiments, the frequency spectrum of any of the first and second pluralities of phase coherent frequencies can span a range of at least about 1 octave.

In some embodiments, the system may further comprise an optical combiner for receiving the radiation from the first and second lasers and generating a combined radiation beam directed to the detector. In some embodiments, at least one of the first and second lasers can generate continuous-wave (CW) radiation. In some embodiments, at least one of the first and second lasers can generate pulsed radiation. In some embodiments, at least one of the first and second lasers can generate chirped pulsed radiation. In some embodiments, at least one of the first and second lasers can comprise a quantum cascade laser. In some embodiments, at least one of said first and second laser sources can comprise an infrared laser source. In some embodiments, at least one of said first and second laser sources can comprise a terahertz laser source. In some embodiments, at least one of said first and second laser sources can comprise a laser diode. In some embodiments, at least one of said laser sources can comprise a micro-ring resonator, e.g., a micro-ring resonator generating a frequency comb. In some embodiments, the multi-mode radiation generated by each of said first and second laser sources can comprise a frequency comb.

In some embodiments, the system can comprise two detectors, each of which receives a combination of the multi-mode radiation generated by the first and second laser sources to generate a multi-heterodyne signal. In some such systems, the analyzer can operate on the multi-heterodyne signal associated with one of the detectors to generate the estimates of any of phase error and timing error and can apply those estimates to a respective multi-heterodyne signal generated by the other detector to generate a corrected multi-heterodyne signal.

In one example, the predictive model of said multi-heterodyne signal (y(t)) is defined as:

$$y(t) = \sum_n A_n e^{i2\pi \int f_n dt} = \sum_n r_n e^{i\varphi_n} e^{i2\pi \int f_n dt}$$

wherein,
- $A_n$ denotes a complex amplitude associated with $n^{th}$ beat frequency characterized by a real amplitude $r_n$ and a phase $\varphi_n$,
- $f_n$ denotes the frequency of the $n^{th}$ beat frequency.

In one example, the analyzer minimizes an error function defined as:

$$J(x) = \sum_k \|y_k - h(x_k)\|_{R^{-1}}^2 + \|x_k - f(x_{k-1})\|_{Q^{-1}}^2$$

wherein,
- $x_k$ denotes a state of the system at time k,
- $y_k$ denotes measurement of the multi-heterodyne signal at time k,
- $h(x_k)$ denotes the measurement function h evaluated at state $x_k$ and defined as follows:
- $h(x_k) = \sum_n A_{nk} e^{i2\pi\phi_{nk}} = \sum_n r_{nk} e^{i\varphi_{nk}} e^{i\phi_{nk}}$, wherein $A_{nk}, r_{nk}, \varphi_{nk}, \phi_{nk}$ denote, respectively, $A_n, r_n, \varphi_n$ and $\phi_n$ evaluated at time k,
- $f(x_k)$ denotes the time evolution function $f$ evaluated at state $x_k$ such that:

$$r_{n(k+1)} = r_{nk}$$

$$\varphi_{n(k+1)} = \varphi_{nk}$$

$$\phi_{n(k+1)} = \phi_{nk} + 2\pi\Delta t\, f_{nk}$$

wherein $r_{n(k+1)}, \varphi_{n(k+1)}, \phi_{n(k+1)}$, denote, respectively, $r_n, \varphi_n,$ and $\phi_n$ evaluated at time k+1, R is said measurement noise covariance, and Q is said process noise covariance, such as amplitude and noise phase associated with the laser sources.

According to another aspect, a method for processing a multi-heterodyne signal is disclosed, which comprises generating from a first laser source multi-mode radiation having a frequency spectrum characterized by a first plurality of phase coherent frequencies, and generating from a second laser source multi-mode radiation having a frequency spectrum characterized by a second plurality of phase coherent frequencies. The method can further comprise detecting a combination of the multi-mode radiation generated by the first and second laser sources so as to provide a multi-heterodyne signal having a frequency spectrum characterized by a plurality of beat frequencies, each beat frequency corresponding to a pairwise difference between the first and second plurality of phase coherent frequencies. The method can further comprise receiving said multi-heterodyne signal and employing a predictive model of said multi-heterodyne signal to provide estimates of any of phase error and timing error associated with the beat frequencies.

In some embodiments, the method can further comprise correcting any of said phase error and timing error of the detected multi-heterodyne signal based on the estimates so as to generate a corrected multi-heterodyne signal. The method can further comprise minimizing an error function associated with a difference between the detected and the predicted multi-heterodyne signal to provide the estimated phase and timing errors. In one example, said error function may be minimized using an extended Kalman filter, an unscented Kalman filter, or a particle filter.

In one example, the predictive model of said multi-heterodyne signal may be defined as:

$$y(t) = \sum_n A_n e^{i(\varphi_0 + n\Delta\varphi)} = \sum_n r_n e^{i\varphi_n} e^{i(\varphi_0 + n\Delta\varphi)}$$

wherein, $A_n$ denotes a complex amplitude associated with $n^{th}$ beat frequency characterized by a real amplitude $r_n$ and a phase $\varphi_n$, $\varphi_0$ denotes frequency offset phase and is defined as follows:

$$f_0 = \frac{1}{2\pi} \frac{d\varphi_0}{dt},$$

where $f_0$ denotes a time-dependent frequency offset between two lowest frequencies of said first and second plurality of frequencies, $\Delta\varphi$ denotes repetition rate phase and is defined as follows:

$$\Delta f = \frac{1}{2\pi} \frac{d\Delta\varphi}{dt},$$

where $\Delta f$ denotes said repetition rate of said beat frequencies.

In some embodiments, the method can further comprise combining the multi-mode radiation generated by said first and second lasers to generate a combined beam for detection by the detector. In some embodiments, at least one of the first and second lasers can generate continuous-wave (CW) radiation. In some embodiments, at least one of the first and second laser sources can generate pulsed radiation. In some embodiments, at least one of the first and second laser sources can comprise a quantum cascade laser. In some embodiments, at least one of the first and second laser sources can comprise an infrared laser source. In some embodiments, at least one of the first and second laser sources can comprise a terahertz laser source.

According to a related aspect, a multi-heterodyne spectrometer is disclosed, which comprises a first laser source for generating multi-mode radiation having a frequency spectrum characterized by a first plurality of phase coherent frequencies, and a second laser source for generating multi-mode radiation having a frequency spectrum characterized by a second plurality of phase coherent frequencies. The spectrometer can further comprise a sample holder arranged such that the multi-mode radiation generated by at least one of the first and second laser sources passes through said sample holder so as to interact with a sample contained therein. The spectrometer may further comprise at least one detector for detecting a combination of the multimode radiation generated by the first and second lasers, wherein the combination includes at least one multimode radiation having passed through the sample holder, so as to generate a multi-heterodyne signal having a frequency spectrum characterized by a plurality of beat frequencies, each beat frequency corresponding to a pairwise difference between the first and second plurality of phase coherent frequencies. The spectrometer can further comprise an analyzer for receiving the multi-heterodyne signal and configured to employ a predictive model of the multi-heterodyne signal to provide estimates of any of phase error and timing error associated with said beat frequencies.

In some embodiments, the analyzer can correct any of said phase error and timing error of the detected multi-heterodyne signal based on said estimates so as to generate a corrected multi-heterodyne signal. In some embodiments, the analyzer can determine at least one property of the sample based on an analysis of said corrected multi-heterodyne signal.

In a related aspect, a method for processing a multi-heterodyne signal is disclosed, which comprises generating from a first laser source multi-mode radiation having a frequency spectrum characterized by a first plurality of phase coherent frequencies, generating from a second laser source multi-mode radiation having a frequency spectrum characterized by a second plurality of phase coherent frequencies, detecting a combination of said multi-mode radiation generated by said first and second laser sources so as to provide a multi-heterodyne signal having a frequency spectrum characterized by a plurality of beat frequencies, each beat frequency corresponding to a pairwise difference between said first and second plurality of phase coherent frequencies, and computationally estimating any of phase and timing error associated with said multi-heterodyne signal. In many embodiments, the step of computationally estimating the phase and/or timing error is accomplished by employing only the information that is contained within the multi-heterodyne signal itself. The error estimates can then be utilized to compute a corrected multi-heterodyne signal.

Further understanding of various aspects of the invention can be obtained by reference to the following detailed description in conjunction with the associated drawings, which are described briefly below.

BRIEF DESCRIPTION OF THE DRAWINGS

FIG. 11A schematically depicts an experimental set-up used to measure a multi-heterodyne signal generated via mixing of radiation from two multi-mode lasers;

FIG. 11B shows quadrature components of a multi-heterodyne signal generated by source shown in FIG. 11A, obtained by IQ-demodulation;

FIG. 11C shows a frequency domain multi-heterodyne signal over an integration time of 100 µs;

FIG. 11D shows frequency domain multi-heterodyne spectra obtained over 1 µs at various times;

DETAILED DESCRIPTION

Figure 1:
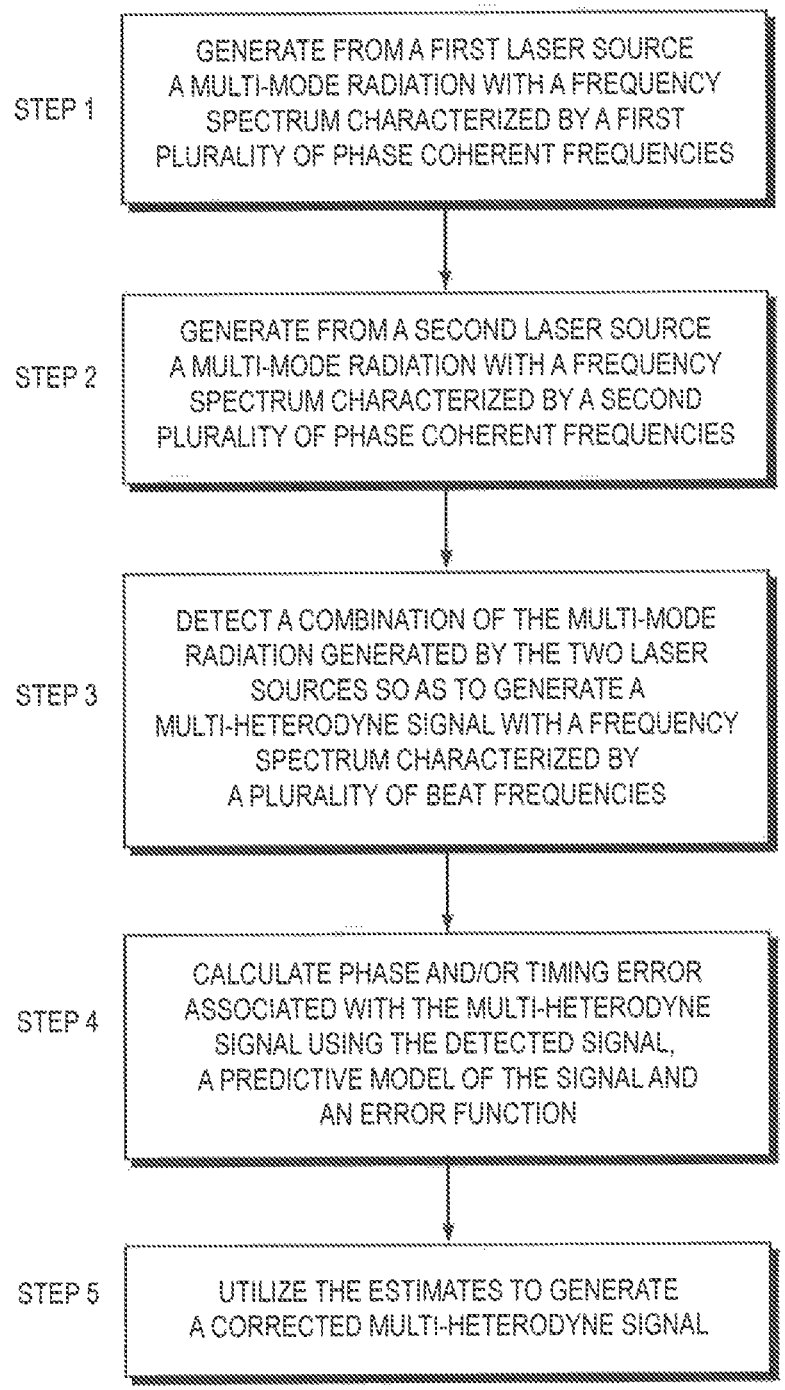
FIG. 1 is a flow chart illustrating an embodiment of a method of processing a multi-heterodyne signal according to aspects of the present disclosure.

The present invention relates generally to multi-heterodyne systems and methods, and more particularly to methods and systems for computationally correcting any of the phase and timing error associated with a multi-heterodyne signal generated by beating two or more sets of phase coherent frequencies by employing information contained within the signal itself. Although in the following description, various aspects of the invention are described by reference to frequency combs, it should be understood that the application of the present teachings are not limited to frequency combs, but rather the present teachings can be applied to any multi-heterodyne signal generated by beating two or more sets of phase coherent frequencies. As discussed in more detail below, in many embodiments, estimates of the phase and timing error associated with a measured multi-heterodyne signal are computationally estimated and the estimates are employed to obtain a corrected multi-heterodyne signal. More specifically, in many embodiments, a measured multi-heterodyne signal and a predictive model of the signal are employed in an error function and the error function is minimized to obtain estimates of the phase and the timing error. The present teachings can be employed in connection with a variety of light sources that generate phase coherent frequencies, and in particular frequency combs. For example, frequency combs have been generated in the THz range by down-conversion of ultrafast laser pulses, which forms time-domain THz pulses with well-defined phases. More recently, THz combs based on quantum cascade lasers have been generated via nonlinearities in low-dispersion cavities.

Various terms are used herein consistent with their common meanings in the art. By way of further illustration, the following terms as used herein are defined as follows:

The term "frequency comb" as used herein refers to a frequency spectrum including a series of discrete, equally spaced frequencies.

The first-order coherence of a pair of oscillators of complex amplitudes $A_n$ and $A_m$ is defined as follows:

$$g_{nm} \equiv \frac{\langle A_n^* A_m \rangle}{\sqrt{|A_n|^2 |A_m|^2}} \quad (1)$$

The coherence of lines n and m is assessed by a heterodyne coherence measurement with any sufficiently fast detector having sufficient sensitivity to sense nonzero power of both line n and line m with a signal-to-noise ratio of at least 1 over some measurement time. For example, with a detector of noise equivalent power having NEP=$10^{-9}$ W/sqrt (Hz) and a line of power 1 µW, a sufficient integration time would be roughly $$0.5 \left( \frac{NEP}{P} \right)^2,$$

or about 0.5 µs.

The term "phase coherent frequencies" are used herein refers to at least two frequencies (associated with frequency lines n and m) in the frequency spectrum of a light source (typically a laser) that exhibit a first-order coherence $|g_{nm}|>0$ within a 95% confidence level over the measurement time defined by NEP to obtain a signal-to-noise ratio of at least 1 for sensing the lines n and m.

The term "phase error" as used herein refers to phase fluctuations (e.g., phase drift) of one or more frequency lines present in a frequency spectrum, and more particularly, a frequency spectrum comprising a plurality of phase coherent frequencies. With respect to a multi-heterodyne signal, phase error refers to phase fluctuations (e.g., phase drift) associated with frequency lines in the signal, which can be obtained, e.g., by integrating frequency fluctuations over time. The phase error in the multi-heterodyne signal can arise, for example, from phase errors in the frequency combs generating the multi-heterodyne signal, which can in turn result, for example, from temperature fluctuations, laser pump fluctuations, laser dynamics, mechanical fluctuations, optical feedback, etc.

The term "timing error" as used herein refers to fluctuations in the repetition rate associated with a plurality of coherent frequencies (e.g., frequency comb). The timing error can result in fluctuations of the frequency spacing between adjacent frequency lines, which can in turn result, for example, from temperature fluctuations, laser pump fluctuations, laser dynamics, mechanical fluctuations, optical feedback, etc.

With reference to the flow chart of FIG. 1, in one embodiments, a method of processing a multi-heterodyne signal includes generating from a first laser source a multi-mode radiation having a frequency spectrum characterized by a first plurality of phase coherent frequencies (step 1), and generating from a second laser source a multi-mode radiation having a frequency spectrum characterized by a second plurality of phase coherent frequencies (step 2). A combination of the multi-mode radiation generated by the first and the second laser is detected to generate a multi-heterodyne signal having a frequency spectrum characterized by a plurality of beat frequencies, where each beat frequency corresponds to a pairwise frequency difference of the first and second plurality of phase coherent frequencies (step 3). The detected multi-heterodyne signal and a predictive model of the multi-heterodyne signal are employed to provide estimates of any of phase error and timing error associated with the beat frequencies (step 4). These estimates can then be utilized to correct any of the phase error and the timing error associated with the detected multi-heterodyne signal so as to produce a corrected multi-heterodyne signal (step 5).

The radiation generated by the first and the second laser can be a continuous-wave (CW) radiation or a pulsed radiation. In some embodiments, the laser radiation generated by any of the first and second laser source can be a chirped pulsed radiation. The frequencies associated with the radiation generated by each laser can be in any suitable region of the electromagnetic spectrum. For example, in some embodiments, the frequencies can be in the infrared region of the electromagnetic spectrum (e.g., in a wavelength range of about 800 nm to about 30 µm). In other embodiments, the frequencies can be in the terahertz region of the electromagnetic spectrum (e.g., in a range of about 300 GHZ to about 10 THz).

Figure 2A:
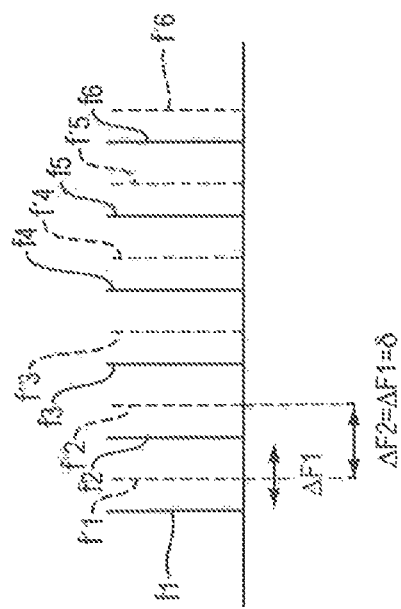
FIG. 2A schematically depicts two frequency-offset frequency combs.

By way of illustration, FIG. 2A schematically depicts a first set of frequencies f1, f2, f3, f4, f5, and f6 associated with the radiation generated by the first laser and a second set of frequencies f'1, f'2, f'3, f'4, f'5 and f'6 associated with the second laser. In this illustration, each of the first and the second frequency set is a frequency comb characterized by a plurality of equally spaced frequencies. The frequencies of the first and the second comb are offset relative to one another.

More specifically, the first frequency comb (depicted with solid lines) has a mode spacing, also known as a repetition rate, $\Delta F_1$, and the second frequency comb (depicted by broken lines) has a slightly different repetition rate, $\Delta F_2$, where $\Delta F_2 = \Delta F_1 + \delta$. By way of example, in some embodiments, each of the $\Delta F_1$ and $\Delta F_2$ can be in a range of about 1 GHz to about 50 GHz.

Figure 2B:
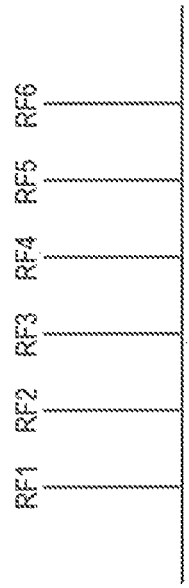
FIG. 2B schematically depicts a plurality of beat frequencies generated via mixing the frequency combs depicted in FIG. 2A.

As noted above, the detection of the combination of the first and second multi-mode radiation can result in the generation of a multi-heterodyne signal characterized by a plurality of beat frequencies (typically in the radiofrequency (RF) regime) corresponding to the pairwise difference of the frequencies present in the radiation generated by the two lasers. By way of illustration, FIG. 2B schematically depicts the beat frequencies that can be present in a multi-heterodyne signal generated via mixing of the two frequency-offset frequency combs depicted in FIG. 2A. For example, the beat frequencies RF1 and RF3 correspond, respectively, to the difference in the frequencies f1 and f'1 and f3 and f'3 of the two frequency combs. It should be understood that these illustrative figures are provided only for ease of explanation of various features of the invention, and not intended to limit the scope of the present teachings. In particular, as noted above, the applicability of the present teachings is not limited to frequency combs.

Referring again to the flow chart of FIG. 1, the step of determining estimates of the phase and/or the timing error can involve minimizing an error function indicative of a difference between the detected multi-heterodyne signal and a predicted multi-heterodyne signal generated via the predictive model. A variety of different predictive models can be employed. For example, the predictive model of the multi-heterodyne signal can be defined in accordance with Equations (3) below. In some embodiments, the error function can also incorporate the statistics of the noise associated the radiation generated by the lasers. By way of example, the amplitude noise and/or the phase noise of one or more of the lasers can be taken into account.

After the phase and timing errors are estimated, the multiheterodyne signal can be corrected. For example, when Equation (3) below represents the measured multiheterodyne signal (i.e., the signal is $y(t)=\Sigma_n A_n e^{i(\varphi_0+n\Delta\varphi)}$), phase correction is simple since phase fluctuations are common to all comb lines and manifest as a pure multiplication. Therefore, phase correction can be performed by calculating $y_0(t)=e^{-i\varphi_0}y(t)$. Timing fluctuations can present a more substantial challenge, since the effect of timing fluctuations is to nonlinearly stretch the time axis. Defining an effective time $$\tau(t) = \frac{\Delta\varphi}{2\pi\langle\Delta f\rangle},$$

the phase-corrected multiheterodyne signal can be written as $y_0(t)=\Sigma_n A_n e^{in2\pi(\Delta f)\tau}$. Therefore, the phase-timing corrected signal can be found by interpolating $y_0(t)$ onto a uniform grid, effectively calculating $y_{0A}(t)=y_0(\tau^{-1}(t))$. In one embodiment, a standard nonuniform Fast Fourier Transform can be Fused to perform the interpolation.

Figure 3:
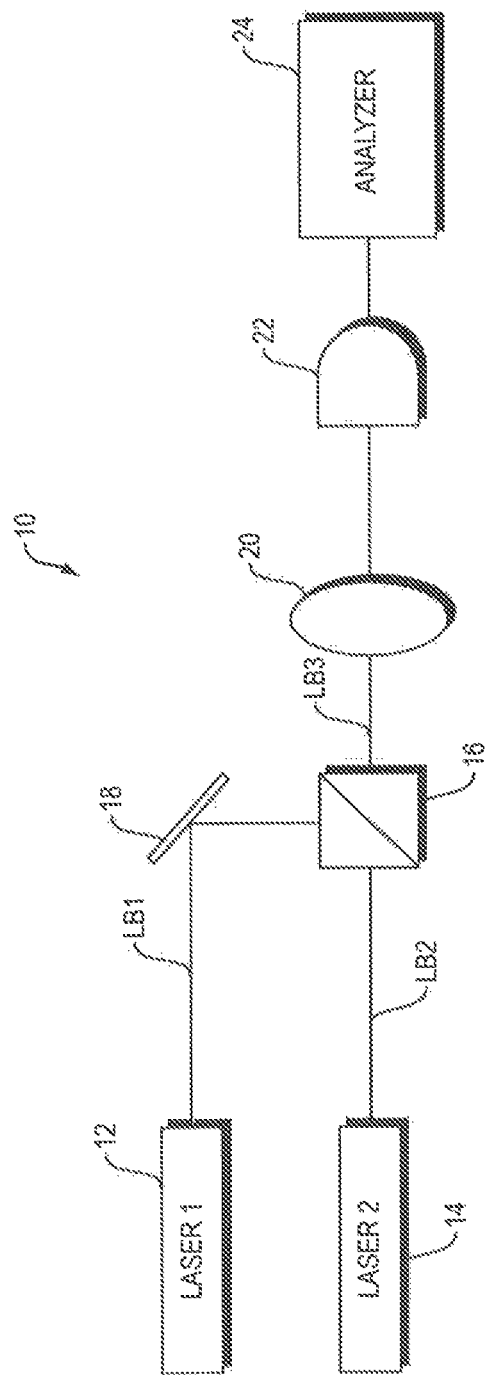
FIG. 3 is a schematic diagram of one embodiment of a multi-heterodyne system according to aspects of the present disclosure.

The methods of the invention for processing a multi-heterodyne signal can be implemented in a variety of systems. By way of example, FIG. 3 schematically depicts an embodiment of such a system 10 having two laser systems 12 and 14. Each of the laser systems 12 and 14 generates a multi-mode radiation having a frequency spectrum characterized by a plurality of phase coherent frequencies. More specifically, the laser 1 generates a laser beam (LB1) having a frequency spectrum characterized by a plurality of phase coherent frequencies, and the laser system 2 generates a laser beam (LB2) having a frequency spectrum characterized by a plurality of phase coherent frequencies. A variety of laser systems can be employed. For example, in some embodiments one or both of the lasers 12 and 14 generate CW laser radiation while in other embodiments one or both of the laser systems 12 and 14 can generate pulsed radiation. Further, the lasers 12 and 14 can operate in different frequency regimes, e.g., based on a desired application. For example, the lasers 12 and 14 can generate infrared, or terahertz radiation. In some embodiments, the lasers can be diode lasers. In some embodiments, the lasers can be quantum cascade lasers, e.g., quantum cascade lasers operating in the terahertz region of the electromagnetic spectrum.

With continued reference to FIG. 3, the system 10 further includes an optical combiner 16 (e.g., a beam splitter) that receives the radiation beam (LB1) generated from the laser 1 (via reflection of the beam from a mirror 18) as well as the radiation beam (LB2) generated by the laser 2 and overlaps the two radiation beams to generate a combined beam (LB3). In this embodiment, a convergent lens 20 focuses the combined beam onto a detector 22, which detects the radiation to generate a multi-heterodyne detected signal. The detected signal includes a frequency spectrum characterized by a plurality of beat frequencies corresponding to the differences between the frequencies associated with the two laser beams. A plurality of different detectors can be employed, e.g., depending on the frequencies of the laser beams and/or a particular application, among others. By way of example, the detector 22 can be a hot electron bolometer detector, or a Schottky diode detector, among others.

The system 10 further includes an analyzer 24 that is electrically coupled to the detector 22 so as to receive the multi-heterodyne signal generated by the detector. The analyzer can operate on the multi-heterodyne signal so as to provide estimates of the phase error and/or timing error associated with the detected multi-heterodyne signal. By way of example, the analyzer can employ the measured multi-heterodyne signal, e.g., over a given time interval, and a predictive model of the multi-heterodyne signal as input to an error function and minimize the error function so as to obtain estimates of the phase error and/or the timing error. The analyzer can then employ those estimates to generate a corrected multi-heterodyne signal. The analyzer can employ a plurality of different error functions for obtaining estimates of the phase and/or the timing errors. By way of example, the error function an comprise a suitably regularized norm, such as ridge regression (also known as Tikhonov regularization), basis pursuit (also known as LASSO), and the Dantzig Selector, etc. In some embodiments, unscented or scented Kalman filters can be used to minimize the error function.

By way of example, defining an effective time the multi-heterodyne signal y(t) can be written as $y(t) = e^{i\varphi_0(t)} (\Sigma_n \Sigma_n A_n e^{in 2\pi <\Delta f> \tau(t)})$, where n refers to the frequency lines in the multi-heterodyne signal, $A_n$ denotes the amplitude of the $n^{th}$ line. The phase corrected signal can be found by calculating $y_0(t) = e^{-i\varphi_0(t)} y(t)$, and the phase-timing corrected signal can be found, for example, by using a non-uniform FFT (Fast Fourier Transform) to interpolate $y_0(t)$ onto a linear grid, effectively calculating $y_{0A}(t) \equiv y_0(\tau^{-1}(t))$.

In some embodiments, an extended Kalman filter can be used for computationally obtaining estimates of the phase and the timing error. The extended Kalman filter can be viewed as fitting the measured data to a predictive model with a regularization constraint. Such an optimization can be carried out, for example, by minimizing an error function as follows:

$$J(x) = \Sigma_k \|y_k - h(x_k)\|_{R^{-1}}^2 + \|x_k - f(x_{k-1})\|_{Q^{-1}}^2 \qquad (2)$$

wherein, $x_k$ denotes a state of the system at time k, $y_k$ denotes measurement of the multi-heterodyne signal at time k, $h(x_k)$ denotes measurement function h(x) evaluated at state $x_k$ as follows:

$h(x_k) = \Sigma_n A_{nk} e^{i(\varphi_{0k} + n\Delta\varphi_k)} = \Sigma_n r_{nk} e^{i\varphi_{nk}} e^{i(\varphi_{0k} + n\Delta\varphi_k)}$, wherein $A_{nk}$, $r_{nk}$, $\varphi_{nk}$, $\varphi_{0k}$, $\Delta\varphi_k$ denote, respectively, $A_n$, $r_n$, $\varphi_n$, $\varphi_0$, and $\Delta\varphi$ evaluated at time k, $f(x_k)$ denotes time evolution function $f(x)$ evaluated at state $x_k$ such that:

$r_{n(k+1)} = r_{nk}$ $\varphi_{n(k+1)} = \varphi_{nk}$ $\varphi_{0(k+1)} = \varphi_{0k} + 2\pi \Delta t\, f_{0k}$ $\Delta\varphi_{k+1} = \Delta\varphi_k + 2\pi \Delta t\, \Delta f_k$ wherein $r_{n(k+1)}$, $\varphi_{n(k+1)}$, $\varphi_{0(k+1)}$, and $\Delta\varphi_{k+1}$ denote, respectively, $r_n$, $\varphi_n$, $\varphi_0$, and $\Delta\varphi$ evaluated at time k+1, R is said measurement noise covariance, Q is said process noise covariance (such as amplitude and noise of the laser sources), and $\|v\|_A^2 \equiv v^t A v$ represents the $L_2$-norm of v with respect to the matrix A.

The first term in the above error function represents how closely the predicted measurement matches the observed measurement, and the second term is a regularization term that takes the role of a time constant, controlling in this case how much multiplicative noise is present in the system.

In some embodiments, the following predictive model (herein also referred to as the measurement model) can be utilized for modeling a multi-heterodyne signal (y(t)) can be defined as follows:

$$y(t) = \Sigma_n A_n e^{i(\varphi_0 + n\Delta\varphi)} = \Sigma_n A_n e^{i\varphi_n} e^{i(\varphi_0 + n\Delta\varphi)} \qquad (3)$$

wherein, $A_n$ denotes a complex amplitude associated with $n^{th}$ beat frequency characterized by a real amplitude $r_n$ and a phase $\varphi_n$, $\varphi_0$ denotes frequency offset phase between the multimode radiation from said first and second lasers and is defined as follows:

$$\tau(t) \equiv \frac{\Delta\varphi(t)}{2\pi <\Delta f>},$$

$$f_0 = \frac{1}{2\pi} \frac{d\varphi_0}{dt},$$

where $f_0$ denotes a time-dependent frequency offset between two lowest frequencies of said first and second plurality of frequencies, $\Delta\varphi$ denotes repetition rate phase and is defined as follows:

$$\Delta f = \frac{1}{2\pi}\frac{d\Delta\varphi}{dt},$$

where $\Delta f$ denotes said repetition rate of said beat frequencies.

Alternative equivalent formulations of the predictive model also exist (e.g., considering the quadratures of the complex amplitudes). Assuming that N is the number of frequency lines under consideration, the state of the system can be described by a vector of length 2N+4, which would contain the offset and the repetition rate ($f_0$ and $\Delta f$), the corresponding phases ($\varphi_0$ and $\Delta\varphi$), the mode amplitudes ($r_n$), and the mode phases ($\varphi_n$). At each timestep, the two frequencies, the modal amplitudes, and the phases can be assumed to be left substantially unchanged—perturbed only the Brownian noise—while the offset and timing phases can be updated by the frequencies:

$r_{n(k+1)} = r_{nk}$ $\varphi_{n(k+1)} = \varphi_{nk}$ $\varphi_{0(k+1)} = \varphi_{0k} + 2\pi\Delta t\, f_{0k}$ $\Delta\varphi_{k+1} = \Delta\varphi_k + 2\pi\Delta t\, \Delta f_k$ wherein $r_{n(k+1)}$, $\varphi_{n(k+1)}$, $\varphi_{0(k+1)}$, and $\Delta\varphi_{k+1}$ denote, respectively, $r_n$, $\varphi_n$, $\varphi_0$, and $\Delta\varphi$ evaluated at time k+1.

Further, the process noise covariance, Q, can contain relatively large amounts of phase and timing noise, relatively small amounts of multiplicative amplitude noise, and relatively small amounts of additional phase noise. In many embodiments, the additional phase noise can be constructed in such a way that it would not contribute any extra phase/timing error, i.e., it can have rank N−2.

The above error function minimized by Kalman filter is nonconvex and consequently possesses local minima. In some cases, the filter may arrive at false minima (e.g., due to noise). Generally, two types of such errors are possible: (1) the model comb's offset would lock to the true offset plus an integer multiple of the true repetition rate: $f_0^{(model)} = f_0^{(true)} + n\Delta f^{(true)}$, and $$\Delta f^{(model)} = \frac{n}{m}\Delta f^{(true)}. \quad (2)$$

The first error is fairly trivial, and is in fact a consequence of the fact that the offset frequency of the RF comb is only defined modulo the repetition rate. The second error could in some cases affect the quality of correction. In some embodiments, to remedy the effect of the second error, an estimate of the repetition rate is pre-calculated using the coherence function $C_\tau(t) \equiv y^+(t+\tau)y(t)$, which contains frequency components at $\Delta f$ in addition to its harmonics. When the filter detects that the modeled repetition rate only has strong components at two lines—signifying that the model might be falsely locked—and is also far from the true repetition rate, the filter can then correct $\Delta f$ by multiplying by the appropriate rational number.

In some cases, a coherent artifact may be present in the extracted phase and timing signals. For example, in some cases, if the process noise of the offset frequency is allowed to be large, the extracted offset frequency may contain spurious components at harmonics of the repetition rate. In many cases, however, such components can be simply filtered out because the dual comb offset arises from the difference in the two combs' individual offsets (which are generally unrelated).

The above equations (3) and (2) provide, respectively, examples of a predictive model and an error function that can be employed by the analyzer 24 for estimating the phase error and/or the timing error associated with the multi-heterodyne signal, e.g., in a manner discussed above.

Figure 4:
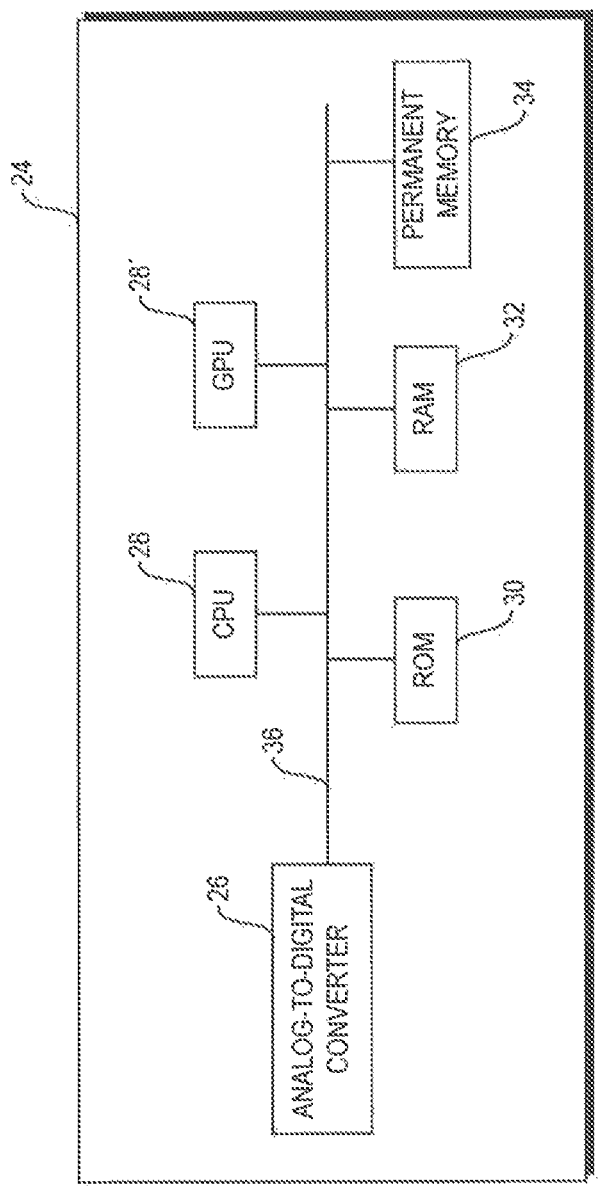
FIG. 4 is a schematic diagram of an exemplary implementation of an analyzer suitable for use in a multi-heterodyne system according to aspects of the present disclosure.

The analyzer 24 can be implemented in hardware, firmware and/or software using techniques known in the art and in accordance with the present teachings. By way of example, FIG. 4 schematically depicts an exemplary implementation of analyzer 24, which includes an analog-to-digital converter 26 for receiving the detected multi-heterodyne signal from the detector 22 and digitizing that signal. The analyzer further includes a central processing unit (CPU) 28 for controlling the operation of the analysis module, including performing calculations and logic operations. The analyzer also includes ROM (read only memory) 30, RAM (random access memory) 32 and permanent memory 34. A communications bus 36 facilitates communication among various components of the analyzer, including communications between the CPU 28 and other components. The memory modules can be used to store instructions for analyzing the multi-heterodyne signal, e.g., in a manner discussed above. By way of example, in some embodiments, instructions for data analysis, e.g., instructions for performing the above steps discussed in connection with FIG. 1, can be stored in the ROM 30. The CPU can employ instructions stored in ROM 30 to operate on digitized multi-heterodyne data stored in RAM 32 to generate estimates of the phase and timing error associated with the multi-heterodyne signal and generate a corrected multi-heterodyne signal. The CPU can effect the storage of the corrected multi-heterodyne signal in permanent memory 34, e.g., in a database.

Figure 5:
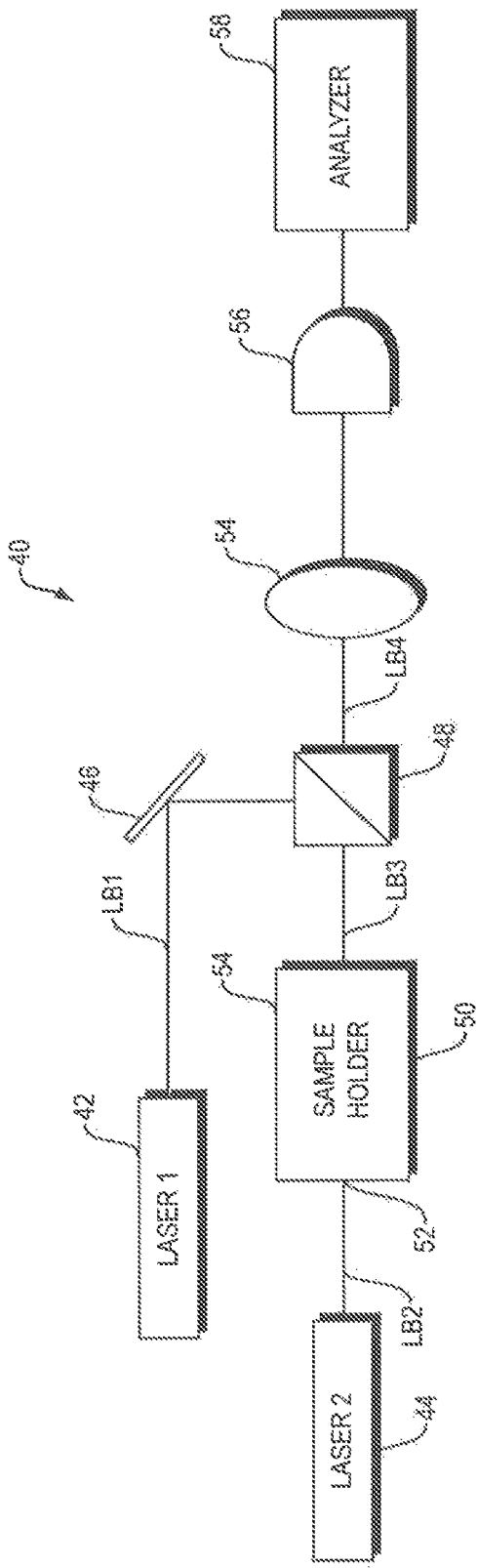
FIG. 5 is a schematic diagram of one embodiment of a multi-heterodyne spectrometer according to aspects of the present disclosure.

In some aspects, the present teachings relate to a multi-heterodyne spectrometer for obtaining information, e.g., spectroscopic information, about a sample under study. FIG. 5 schematically depicts such a spectrometer 40 that includes two lasers 42 and 44, each of which generates laser radiation having a frequency spectrum characterized by a plurality of phase coherent frequencies, as discussed above. More specifically, the laser 1 generates a laser beam (LB1) that is reflected by a mirror 46 to reach an optical combiner 48. The laser 2 generates a laser beam (LB2), which propagates to a sample holder 50 in which a sample under study can be contained. The sample holder 50 can include an input face 52 through which the laser beam (LB2) enters the sample holder and an exit face 54 through which at least a portion of the beam exits the sample holder after its passage therethrough. The laser beam (LB2) interacts with the sample within the sample holder as it propagates through the sample holder. By way of example, in some embodiments, the laser beam (LB2) may excite one or more optical transitions of the sample and hence be at least partially absorbed by the sample. In some embodiments, the laser beam (LB2) may be scattered by the sample.

The laser beam (LB3) exiting the sample holder propagates to the optical combiner 48 and is combined with the laser beam (LB1) to form a combined laser beam (LB4) characterized by at least partial overlap of the laser beams (LB1) and (LB3). A convergent lens 54 focuses the combined laser beam onto the detector 56, which generates a multi-heterodyne signal having a frequency spectrum characterized by a plurality of beat frequencies corresponding to the pairwise mixing of the offset frequencies in the multi-mode radiation generated by the lasers 1 and 2. In effect, the laser beam (LB1) functions as a local oscillator (LO) for the down-conversion of the frequencies present in the spectrum of the laser beam (LB2) and hence the beam (LB3) exiting the sample holder.

Similar to the above system 10, an analyzer 58 receives the multi-heterodyne signal generated by the detector 56 and operates on that signal to estimate and correct the phase and the timing errors associated with the multi-heterodyne signal (i.e., associated with the frequencies present in the multi-heterodyne signal) in a manner discussed above.

Figure 6:
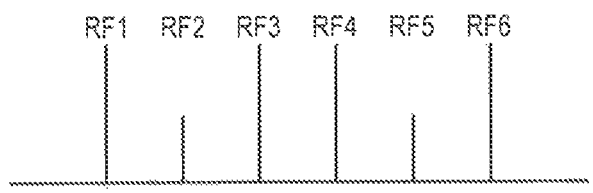
FIG. 6 is a schematic diagram showing a hypothetical intensity variation of the beat frequencies associated with a corrected multi-heterodyne signal according to aspects of the present disclosure, which carries information about a sample under study.

In addition, the analyzer 58 can be configured to analyze the corrected multi-heterodyne signal to extract information about the sample. By way of example, FIG. 6 schematically depicts a hypothetical intensity variation of the beat frequencies associated with the corrected multi-heterodyne signal. By way of example, the variation of the intensities of the beat frequencies can be analyzed (e.g., with respect to a respective variation of the intensities of the beat frequencies when the beam (LB2) passes through a sample holder without a sample therein) to obtain information regarding the sample contained in the sample holder. For example, the decrease in the intensities of one or more of the beat frequencies may be related to the absorption by the sample of the respective optical frequencies of the beam passing through sample, thereby providing a spectroscopic signature of the sample.

The analyzer 58 can be implemented in a variety of ways using known components and techniques. For example, the analyzer 58 can be implemented as shown in FIG. 4 and discussed above. In some embodiments, the instructions for correcting the multi-heterodyne signal received from the detector and for analyzing the corrected multi-heterodyne signal to extract information regarding the sample, e.g., its spectroscopic signature, can be stored, e.g., in the permanent memory 34. This information can be retrieved from the memory 34 by the processor 28 for the analysis of the multi-heterodyne signal received from the detector 56.

In some embodiments, the multi-heterodyne system can include two detectors for detecting a multi-heterodyne signal generated via mixing of two (or more) frequency combs (or more generally two (or more) radiation beams characterized by a plurality of phase coherent frequencies). In some such embodiments, one detector can function as reference detector for generating a multi-heterodyne signal that can be employed to generate estimates of the phase and/or timing errors, which can then be applied to the multi-heterodyne signal generated by the other detector (herein also referred to as the measurement detector).

Figure 7:
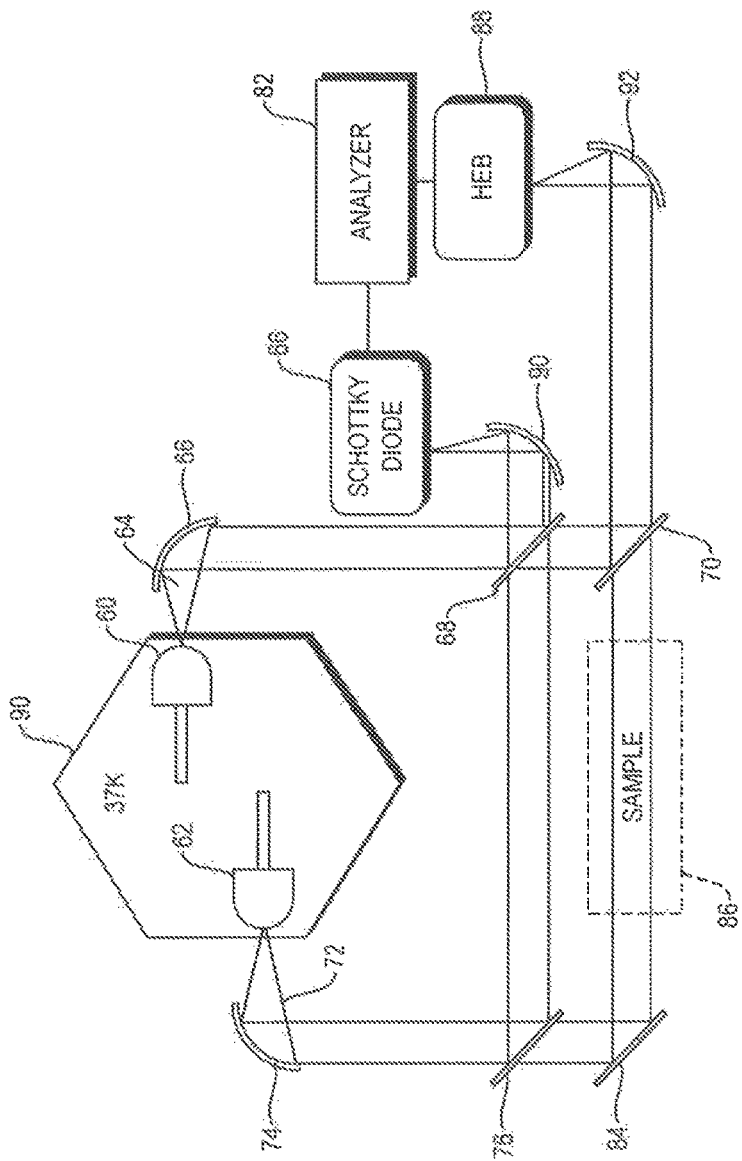
FIG. 7 is a schematic diagram of one embodiment of a spectrometer according to aspects of the present disclosure.

By way of illustration, FIG. 7 schematically shows such a system that includes two lasers 60 and 62, each of which generates a multi-mode laser radiation beam having a frequency spectrum characterized by a plurality of phase coherent frequencies. The radiation beam 64 generated by the laser 60 is reflected by a curved reflector 66, which collimates the beam, toward a beam splitter 68, which reflects a portion of the beam to a curved reflector 90 and allows the passage of the remainder of the beam toward another beam splitter 70. The laser beam 72 generated by the laser 62 is in turn reflected by a curved reflector 74 to propagate toward the beam splitter 76. A portion of the beam 62 is reflected by the beam splitter 76 to pass through the beam splitter 68 to overlap the portion of the beam 64 that has been reflected by the beam splitter 68. The combined beam is focused by the curved reflector 90 onto a Schottky diode detector 80. The Schottky diode detector generates a multi-heterodyne signal as a result of mixing of the two radiation beams. An analyzer 82, similar to the analyzers discussed above, can receive this multi-heterodyne signal and generate estimates of the phase and timing errors.

With continued reference to FIG. 7, the portion of the laser beam 72 that passes through the beam splitter 76 is reflected by a mirror 84 to reach a sample holder 86 in which a sample under study can be contained. After passage through the sample holder and interacting with the sample, the laser beam propagates to a beam splitter 70, which receives a portion of the other laser beam 64 after its passage through the beam splitter 68 and combines the two beams to a combined beam that is focused via a curved reflector 92 onto a hot electron bolometer detector 88. The detector 88 generates a multi-heterodyne signal and the signal is received by the analyzer 82. The analyzer 82 employs the estimates of the phase error and timing error calculated based on the analysis of the multi-heterodyne signal generated by the detector 88 to generate a corrected multi-heterodyne signal. Further, the analyzer 82 can analyze the multi-heterodyne signal to extract the sample's spectroscopic information, e.g., absorption, which is encoded in the multi-heterodyne signal.

The following examples are provided for further illustration of various aspects of the invention. The examples are provided only for illustrative purposes and are not intended necessarily to indicate the optimal ways of practicing the invention or the optimal results that may be obtained.

Example 1

FIG. 7 illustrates one example of an experimental setup including two lasers 60 and 62, each laser generating a respective THz QCL comb that was used to generate the multi-heterodyne data. Both lasers were lens-coupled and had submilliwatt output powers at 37 K; when biased into the comb regime, their lasing spectra cover approximately 250 GHz at 2.8 THz. Further information regarding the structure of such THZ QCL lasers that are capable of generating radiation combs can be found, e.g., in an article entitled "Terahertz Laser Frequency Combs," authored by Burghoff et al. and published in Nature Photonics, vol. 8, June 2014, pp. 462-467, which is herein incorporated by reference in its entirety. In this example, to minimize their environmental differences, both devices were mounted inside the same pulsed-tube cryocooler 90. To account for amplitude fluctuations, a balanced detection scheme was employed using one superconducting hot-electron bolometer (HEB) mixer 88 that is helium-cooled as the signal detector, and one Schottky mixer 80 operated at room temperature as the reference detector. In other embodiments, other types of detectors may be used.

Both QCLs were biased into a comb regime and the repetition rate beatnotes generated via mixing of their frequency combs were detected using a bias tee. The free-running combs featured repetition rates around 9.1 GHz and were separated by a 36 MHz difference, i.e., $\Delta f\, 2 - \Delta f\, 1 = 36$ MHz. At the same time, a multiheterodyne RF signal centered at 2.2 GHz was detected from both the HEB and the Schottky mixer, indicating that these two combs' offset frequency differed by about 2.2 GHz. The multiheterodyne signals were downconverted into the oscilloscope's bandwidth by IQ demodulation with a synthesizer, and both the in-phase and in-quadrature signals were then recorded with a fast oscilloscope.

Figure 8A:
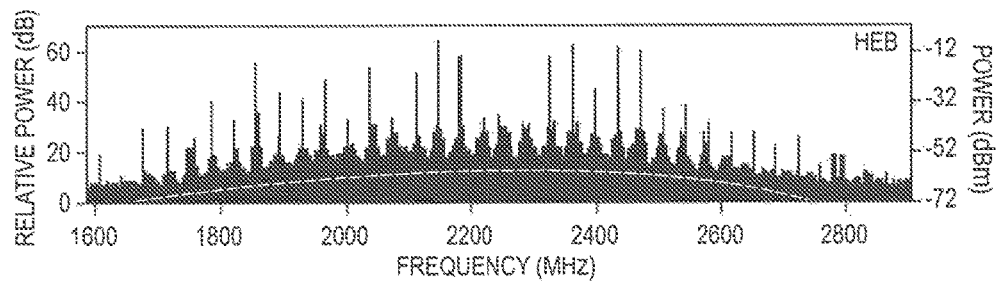
FIG. 8A depicts a multi-heterodyne signal detected via a hot electron bolometer (HEB) with a 100-μs acquisition time in a prototype device based on the embodiment of FIG. 7 with the effective noise floor indicated by a dashed line.
Figure 8B:
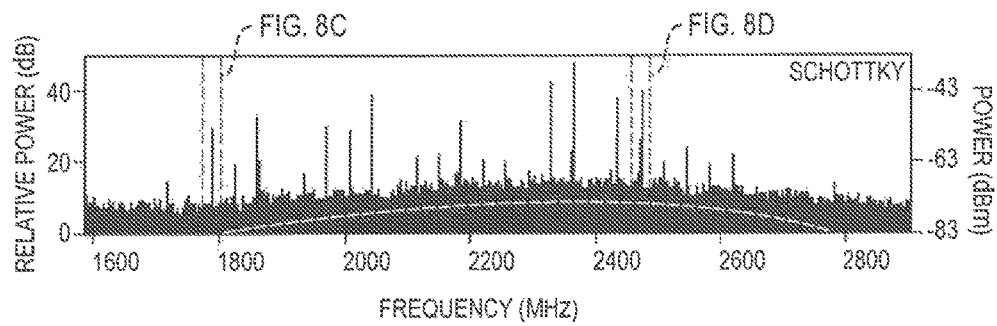
FIG. 8B depicts a multi-heterodyne signal detected by a Schottky mixer using a prototype device based on the embodiment depicted in FIG. 7 corresponding to, and detected during the same time period as, the signal depicted in FIG. 8A.
Figure 8C:
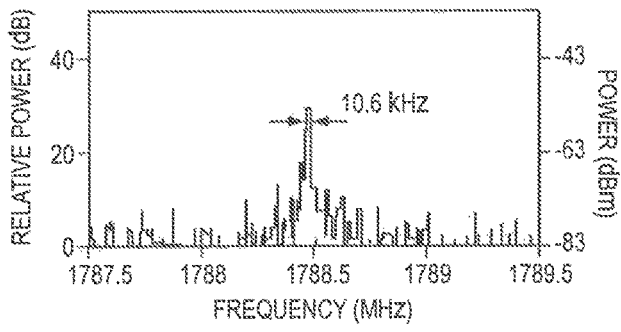
FIGS. 8C and 8D show two multi-heterodyne teeth located, respectively, at 1788.5 MHz and 2472 MHz.
Figure 8D:
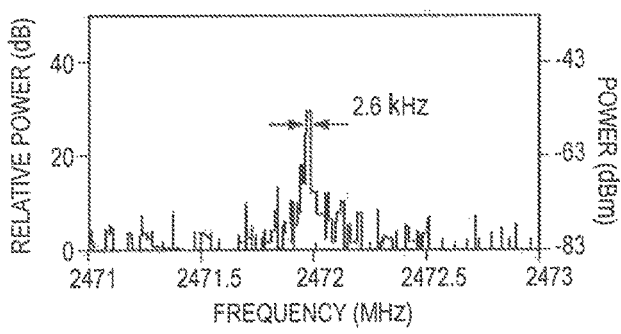

The downconverted multiheterodyne signals were recorded for a duration of 100 μs and are shown in FIGS. 8A and 8B. Absolute power is expressed at the oscilloscope, and relative power is expressed with respect to the system's white noise. The signal from the HEB was used to generate a phase and timing correction signal, and this signal was used to correct both interferograms. Because the radiation had the highly coherent structure of a comb, only two frequency parameters were needed to correct all of the multiheterodyne lines. For example, FIGS. 8C and 8D show two multiheterodyne teeth from the Schottky mixer, located at 1788.5 and 2472 MHz, which have full width half-maximum (FWHM) linewidths of 10.6 kHz and 2.6 kHz, respectively. Both linewidths were at the Fourier uncertainty limit, implying that the correction procedure had removed most of the phase and timing errors. The corrective procedure employed the predictive model and the error function presented above in Equations (3) and (2), respectively. The leftover multiplicative noise after the phase and timing correction contributes to the noise floor of both multi-heterodyne signals, forming a noise pedestal indicated by dashed lines in FIGS. 8A and 8B.

With an acquisition time of 100 μs, the average SNR from the HEB was about 34 dB, and the apparent dynamic range (DNR) was about 52 dB. The multi-heterodyne signal spanned 1.08 GHz with 30 distinguishable teeth, corresponding to optical spectrum coverage greater than 250 GHz at 2.8 THz. The signal from the Schottky mixer had an average SNR of 24 dB and a DNR of 42 dB, although fewer lines were present than were visible from the HEB. The difference between the signals from the two detectors mainly represents their differences in sensitivity, spectral response, and nonlinearity. In particular, saturation of the HEB generates several lines not present on the Schottky mixer, limiting its practical dynamic range to about 37 dB. Still, both detectors are suitable for detecting strong multiheterodyne signals.

Example 2

Figure 9A:
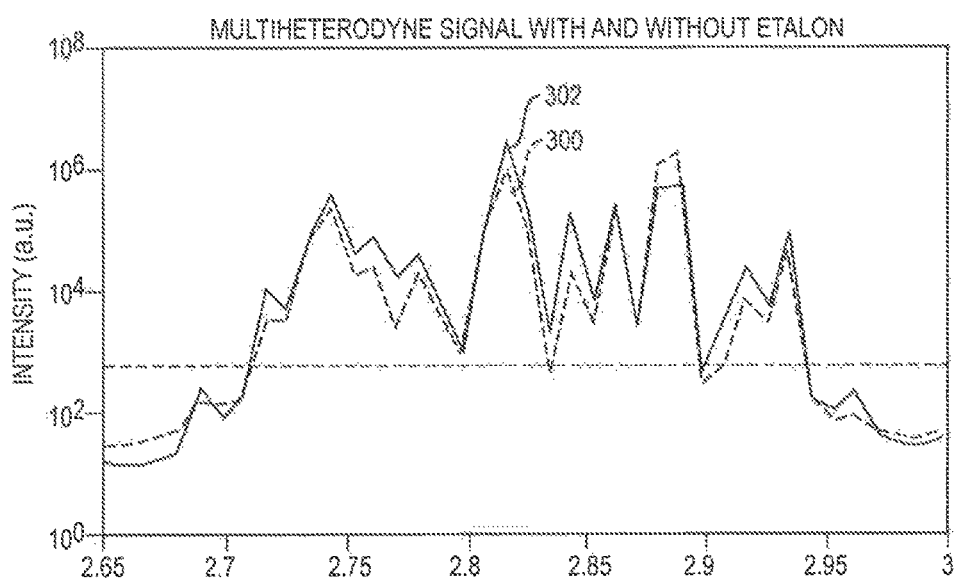
FIG. 9A shows multi-heterodyne signals generated with and without a GaAs etalon according to aspects of the present disclosure (the dashed horizontal line indicates the threshold for inclusion in the transmission data)
Figure 9B:
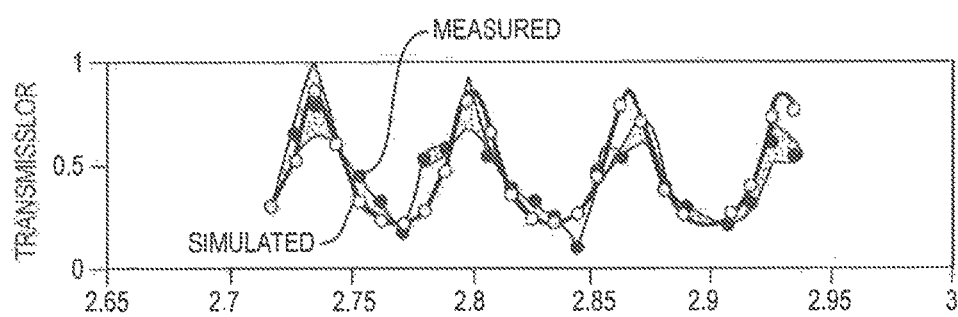
FIG. 9B shows measured etalon transmission and stimulated etalon transmission for the etalon associated with the multi-heterodyne signal depicted in FIG. 9A.

As a demonstration of broadband spectroscopy, transmission measurements of a low-finesse etalon made from a tilted 625 μm thick undoped GaAs wafer were performed. The signal and LO (local oscillator) lasers were shined onto the HEB, and the etalon was placed in the signal laser's path. For this measurement, no reference detector was used. FIG. 9A shows the multi-heterodyne data collected from the HEB over 300 μs with and without the etalon, as shown by lines 300 and 302, respectively. FIG. 9B shows the ratio of individual multi-heterodyne peaks along with the simulated transmission data (dotted line) at the frequencies that were sampled. To account for dynamic range limitations of the HEB, only those transmission values corresponding to the largest 24 lines, whose reference signal was greater than the peak intensity minus 37 dB, were plotted. Periodic transmission due to the etalon was clearly visible within the lasing spectral range, and is in reasonable agreement with the theoretically calculated etalon transmission. Because no reference detector was used, some residual errors were present on account of relative intensity fluctuations that occurred between the two measurements with and without the sample.

Example 3

Multi-heterodyne spectroscopy based on QCLs which are operated in pulsed biasing mode (not to be confused with the optical pulses of a mode-locked laser) was performed. It is well known that operating QCLs in continuous-wave mode is significantly more challenging than operating the same devices in pulsed mode, because CW operation places much greater thermal constraints on the laser in both the midinfrared and the terahertz. Many gain media simply have thresholds that are too high for CW operation and, even when CW operation is possible, the lasers' power dissipation becomes problematic. For dual-comb THz spectroscopy, this is doubly problematic because the two lasers are placed inside the same cooler. In addition, it is often desirable for spectroscopy to have small repetition rates, as the dense mode spacing eases the constraints on the detector and also makes it easier to achieve gapless coverage. This requires longer lasers that consume more power. As an example, 7 mm combs were constructed, which consume approximately 1.3 A (about 1000 A/cm$^2$) and 15 V. Although these lasers have small free spectral ranges, around 4.8 GHz, the two of them together consume about 40 W. This constitutes a major load on the cryocooler and would result in the lasers warming to above their maximum CW operating temperature.

Figure 10A:
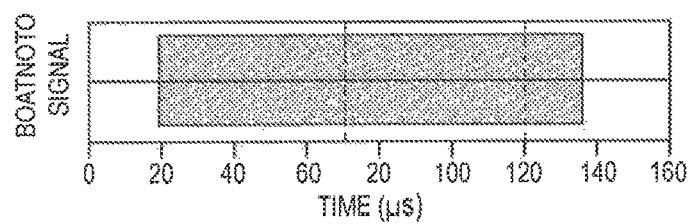
FIG. 10A is a time domain signal of a combs' repetition rate measured electrically from a bias tree.
Figure 10B:
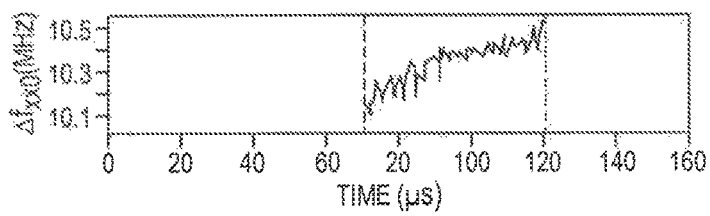
FIG. 10B shows chirping of repetition rates' difference associated with the signal in FIG. 10A.
Figure 10C:
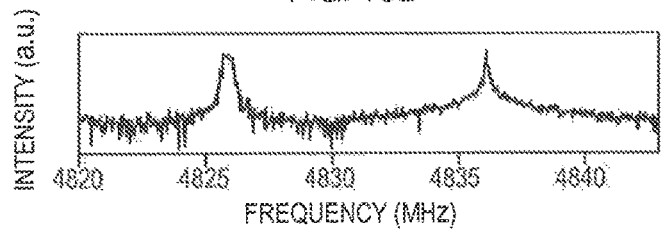
FIG. 10C is a frequency domain signal of combs' repetition rate measured electrically from a bias tee.
Figure 10D:
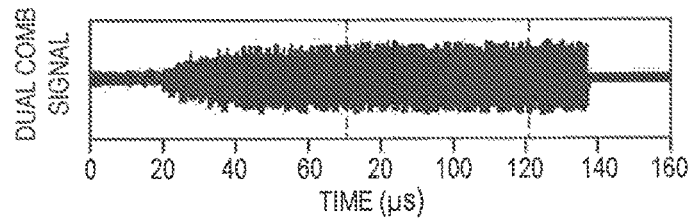
FIG. 10D is a time domain multi-heterodyne signal measured using an HEB detector.

FIGS. 10A-10F show the results of pulsed-mode, dual-comb spectroscopy using the aforementioned devices. The lasers were biased to a comb regime using 120 μs pulses with a repetition frequency of 100 Hz, resulting in a duty cycle of 1.2%. This low duty cycle significantly eases the cryogenic operation. A low-pass filter was used to select only the part of the comb spectrum around 3.3 THz. FIGS. 10A and 10D show, respectively, in the time domain the combs' repetition rate signal (measured from a bias tee) and corresponding multi-heterodyne signal (measured from the HEB). As expected, both signals turn on during the electrical pulse, but while the electrical repetition rate beatnotes turn on within a few microseconds, the optical multi-heterodyne signal takes approximately 30 μs to stabilize. This reflects the fact that electrical beatnotes are unreliable indicators of optical beatnotes. FIG. 10C shows the distinct repetition rate beatnotes in the frequency domain, clearly showing their frequency difference of 10 MHz. In pulsed mode, chirping of the repetition rate due to device heating is noticeable; this heating results in a substantial broadening of the beatnote indicated in FIG. 10C.

Figure 10E:
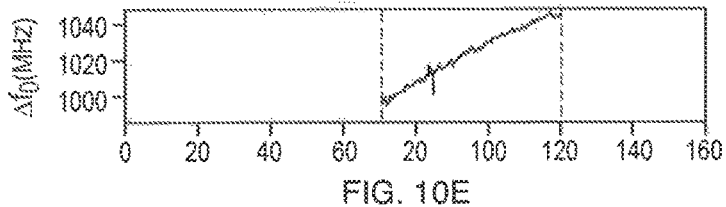
FIG. 10E shows chirping of the offset frequency associated with the signal depicted in FIG. 10D in the interval depicted by the dashed lines.
Figure 10F:
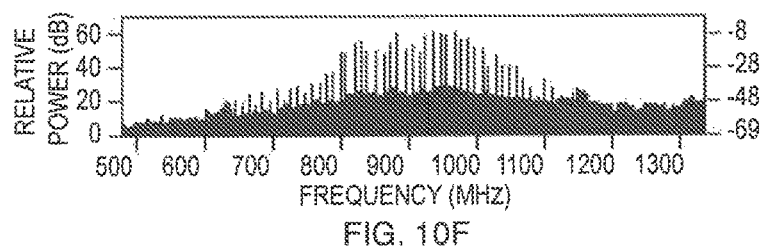
FIG. 10F is a multi-heterodyne signal in the frequency domain, centered at 900 MHz with 45 observable modes (the effective noise floor is indicated by a dashed line)

When the difference in their repetition rates is plotted in the time domain, as shown in FIG. 10B, the chirp due to heating is evident. During the 50 μs period indicated by the two dashed lines, the difference of the combs' repetition rates gradually increases from 10.1 to 10.5 MHz. In addition, FIG. 10E shows the chirp of the offset frequency difference during the same 50 μs; it too is up-chirped. However, its magnitude is much larger, over 40 MHz, which is approximately 100 times the repetition rate chirping. (It is noted that quantifying the absolute frequency of each laser requires an absolute frequency reference.) FIG. 10F shows the phase- and timing-corrected multi-heterodyne signal in the frequency domain. The repetition rate difference of 10 MHz is clearly visible here and over 45 modes are contributing to the multi-heterodyne signal, implying a coverage of 215 GHz in the THz spectrum. Within 50 μs of integration, the average SNR of the multi-heterodyne signal is higher than 25 dB on the HEB Example 4

In this example, the lasers were heterogeneous QCLs that lase around 2.8 THz and are dispersion-compensated, while the detectors used were hot-electron bolometers and Schottky-diode mixers. This example is focused on coherent correction. FIG. 11A shows a simplified experimental setup along with the beatnotes of the lasers, labeled A and B. These beatnotes are separated by 35 MHz, and should lead to an RF comb with repetition rate of 35 MHz. However, because the lasers were operated at a bias in which they were only marginally stable, the beatnotes associated with these lasers were quite broad. Additionally, laser A possesses very clear sidebands (spaced by 140 kHz). As a consequence, the multi-heterodyne signal obtained from these devices, shown in the time domain in FIG. 11B, is of poor quality and possesses very little evidence of the periodicity that should arise from dual combs. Consequently, in the frequency domain, shown in FIG. 11C, the multi-heterodyne signal is broad and possesses very little evidence of a down-converted dual comb structure: over 100 s, the duration of the recording time, all features are completely washed out. One may view this as simply an issue of long term stability and that some structure might be obtained by processing the signal over shorter time intervals; spectra over 1 s are shown in FIG. 11D. Though the comb structure is now evident on some spectra, it is not the case for all of them. In fact, there remain many instances in which phase instabilities completely spoil the spectrum, no matter how short the spectrum is cropped. As a result, the signal needs to be corrected within the duration of an interferogram by the instantaneous phase and timing signals.

Extracting the phase and timing errors from the observed multi-heterodyne signal is essentially a nonlinear estimation problem. Even though there is no a priori knowledge of these errors, nevertheless there is a model of what the RF comb should look like. Specifically, as discussed in detail above, the RF comb is expected to take the following form:

$$y(t) = \sum_n A_n e^{i(\phi_0 + n\Delta\phi)},$$

where $y(t)$ is the measured signal,
$A_n = E^*_{n,B} E_{n,A}$ is the dual comb amplitude of the nth line,
$\phi_0$ and $\Delta\phi$ are the phase corresponding to the offset and repetition rate signals, $$f_{0,A} - f_{0,B} = \frac{1}{2\pi}\frac{d\phi_0}{dt} \text{ and } \Delta f_A - \Delta f_B = \frac{1}{2\pi}\frac{d\Delta\phi}{dt}$$

In addition, the signal itself is corrupted by additive detector noise, and the parameters are all perturbed by multiplicative amplitude noise and phase noise.

If the measurement was a linear function of the parameters, it would be exactly solvable by a Kalman filter. In the case of a nonlinear measurement one must linearize, resulting in an inexact solution. Nevertheless, good results can still be obtained. The process involves fitting the measured multi-heterodyne signal to the dual comb model with the constraint that the dual comb amplitudes vary slowly. Estimates of the offset and repetition rates may be continuously updated without any form of cropping; this in principle makes it very amenable to real-time processing. Alternatively, if the data has been recorded (as in this example), it is possible to perform RTS smoothing, using future knowledge to refine the estimate and to correct for the group delay introduced by the standard filter.

The physics of the comb enter primarily in the form of the multiplicative noise. Specifically, in this example, it is assumed that the comb complex amplitudes are perturbed only slightly at each timestep (giving them a long time constant), whereas the phase and timing errors are perturbed much more (giving them a short time constant). In other words, it is assumed that the comb's phase noise covariance is approximately rank-2. The Kalman filter quite naturally provides a way to test the validity of this assumption, because at every timestep it makes a prediction about what the next measurement will be. By simply comparing the measured signal to the predicted signal, the accuracy of the prediction can be verified. For example, the prediction residual is under 8% of the signal power.

Figure 12A:
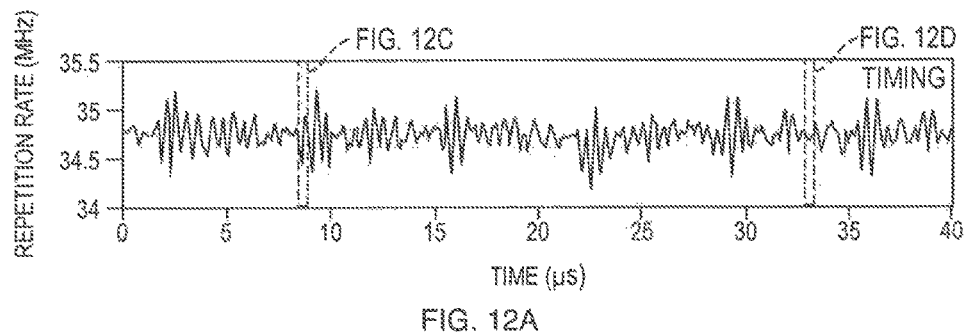
FIG. 12A shows repetition rate fluctuations of a demodulated RF comb.
Figure 12B:
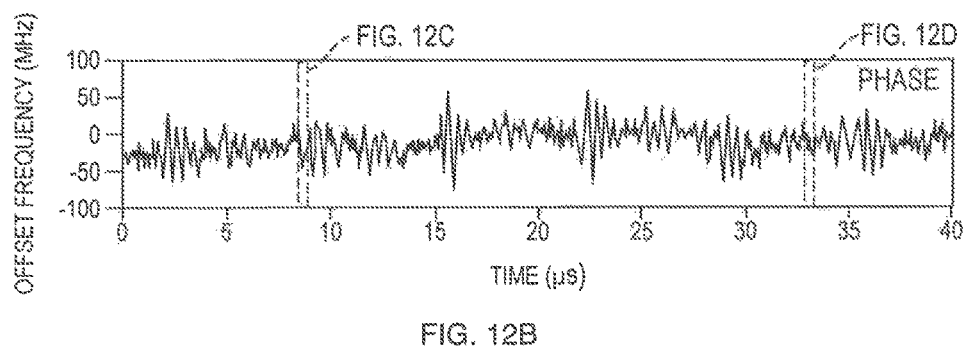
FIG. 12B shows offset fluctuations of the demodulated RF comb.

FIGS. 12A and 12B show the instantaneous repetition rate and offset frequency of the RF comb discussed in connection with FIGS. 11A-D. Several features are immediately apparent. The first is that both frequencies suffer a perturbation that reoccurs every 7 μs, which corresponds to the aforementioned 140 kHz sidebands evident in the beatnote of laser A. In other words, the beatnote undergoes a periodic instability that is imprinted onto the multi-heterodyne spectrum. Secondly, the magnitude of the offset fluctuations (phase error) greatly exceeds the magnitude of the repetition rate fluctuations (timing error). This is not unexpected, since timing fluctuations correspond only to group index whereas phase fluctuations also depend on phase index.

Figure 12C:
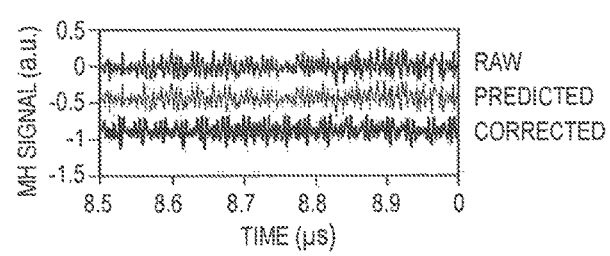
FIGS. 12C and 12D show raw, predicted, and corrected multi-heterodyne signals during instability in the time domain signal and away from it.
Figure 12D:
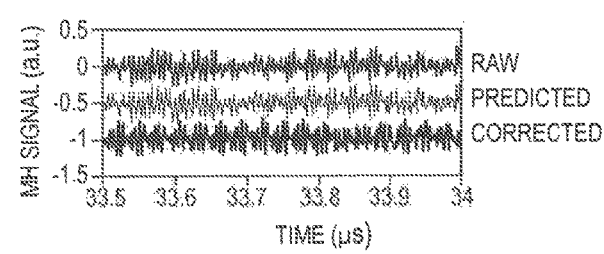

FIGS. 12C and 12D show the time-domain multi-heterodyne signals before and after the phase and timing correction, both during the instability and away from it. During the instability, no clear periodicity or structure is obvious in the raw data; away from it, some periodicity is evident. In both cases, the signal predicted by the filter agrees very well with the actual data. As a result, following the phase and timing correction, the periodic comb structure is recovered.

Figure 13A:
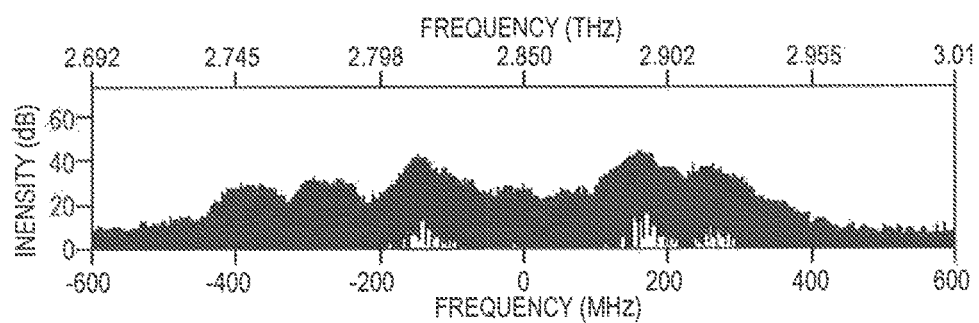
FIG. 13A shows a raw multi-heterodyne signal.
Figure 13B:
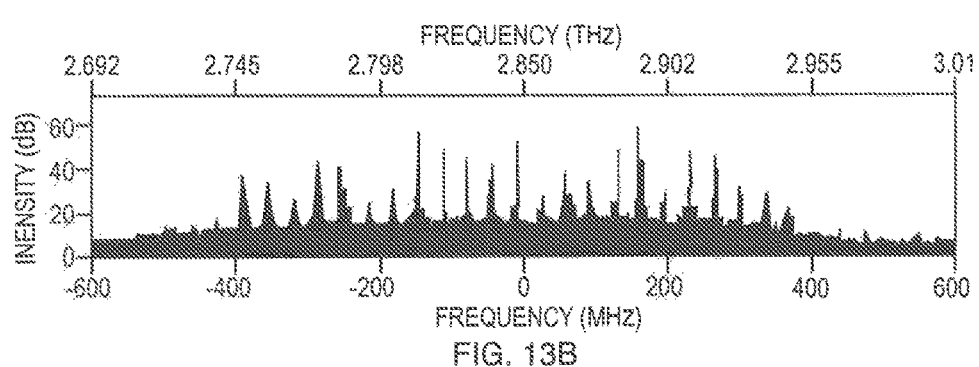
FIG. 13B shows the signal in FIG. 13A following phase correction.
Figure 13C:
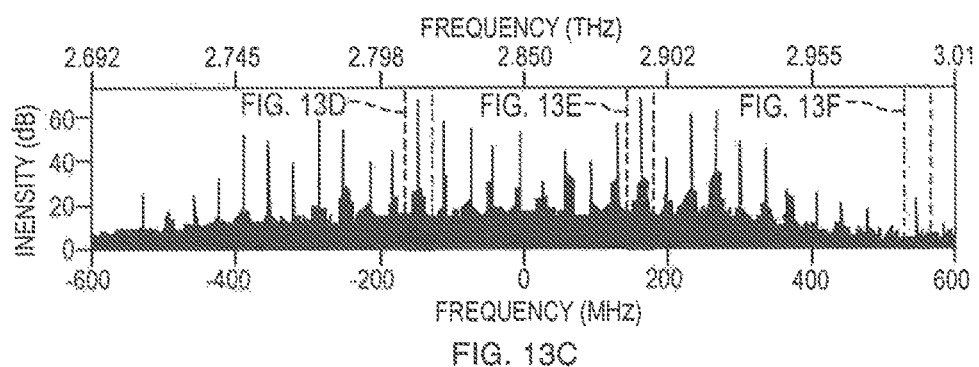
FIG. 13C shows the signal in FIG. 13A following phase and timing correction.

FIGS. 13A-13C show the results of the computational correction in the frequency domain. The raw data from before is shown in FIG. 13A, and once again shows no comb structure. The phase-corrected data is shown in FIG. 13B; because phase correction removes the average offset frequency of the signal in addition to its fluctuations, the average offset <f0> has been re-added to correspond with the raw data. Phase correction reveals the individual multi-heterodyne comb lines, although lines near the center of the comb are better-corrected than lines near the edge because of timing fluctuations are still present. FIG. 13C shows the phase- and timing-corrected spectra, with insets showing zoomed views of several lines. All of the lines in the spectrum have been corrected, with full-width half maxima near the uncertainty limit of 10 kHz. In fact, following the correction some lines have appeared out of the noise floor that were not apparent in the raw data, such as the one shown in the rightmost inset. By filtering the data one can verify that this is real signal (i.e., not a computational artifact), but given detector dynamic range limitations it may arise from detector nonlinearity rather than heterodyne beating. Even though the laser has a large disparity in mode amplitudes and large phase errors, with these techniques it is possible to perform spectroscopy.

Systems and methods disclosed herein can deal with extremely large phase-timing fluctuations. For example, the laser may be biased in an unstable regime, causing the comb to chaotically switch between multiple operating conditions. Even here, correction remains possible. As long as the combs are coherent in the weak sense that the lines are evenly-spaced, with computational correction they become coherent in the strong sense that mutually coherent dual comb spectroscopy can be performed. Although various embodiments disclosed herein focus on unstable combs, the approach disclosed herein is also beneficial for stable combs and even combs operated in pulsed mode.

Although various examples disclosed herein use comb-like light sources, embodiments also work with light sources that are not comb-like, but merely deterministic.

In addition, computational correction offers very good performance even in the case of low signal reference measurements. For example, correction may be based on the multiheterodyne signal from a Schottky mixer, whose raw data has a signal-to-noise ratio (SNR) under 25 dB. Even when the mixer's noise is artificially boosted by 10 dB and little signal remains, computational correction remains informative on both the reference channel and a signal channel.

Example 5

In this example, demonstrated by FIGS. 14A, 14B, 14C, 14D, and 14E, simulated multiheterodyne data was generated, corrupted, and corrected so as to assess the efficacy of the correction. Artificial dual comb data was initially generated in such a way that the comb lines would have power levels that were logarithmically-spaced, from the white noise power level of 0 dB up to a maximum power level of 60 dB. The phases of each line and the order of the lines were chosen randomly. The spectrum is plotted in FIG. 14A and labeled "original." Next, phase and timing error were introduced by means of randomly-chosen noise signals, each of which was generated by an autoregressive process with a characteristic time constant of 1 µs. The resulting multiheterodyne spectrum is also plotted in FIG. 14A and labeled as "corrupted;" the phase and timing corruption result in a completely broadened spectrum. Finally, correction was performed using only information present in the broadened spectrum as previously described; the original clean signal is recovered as is plotted in FIG. 14A and labeled as "restored."

Figure 14A:
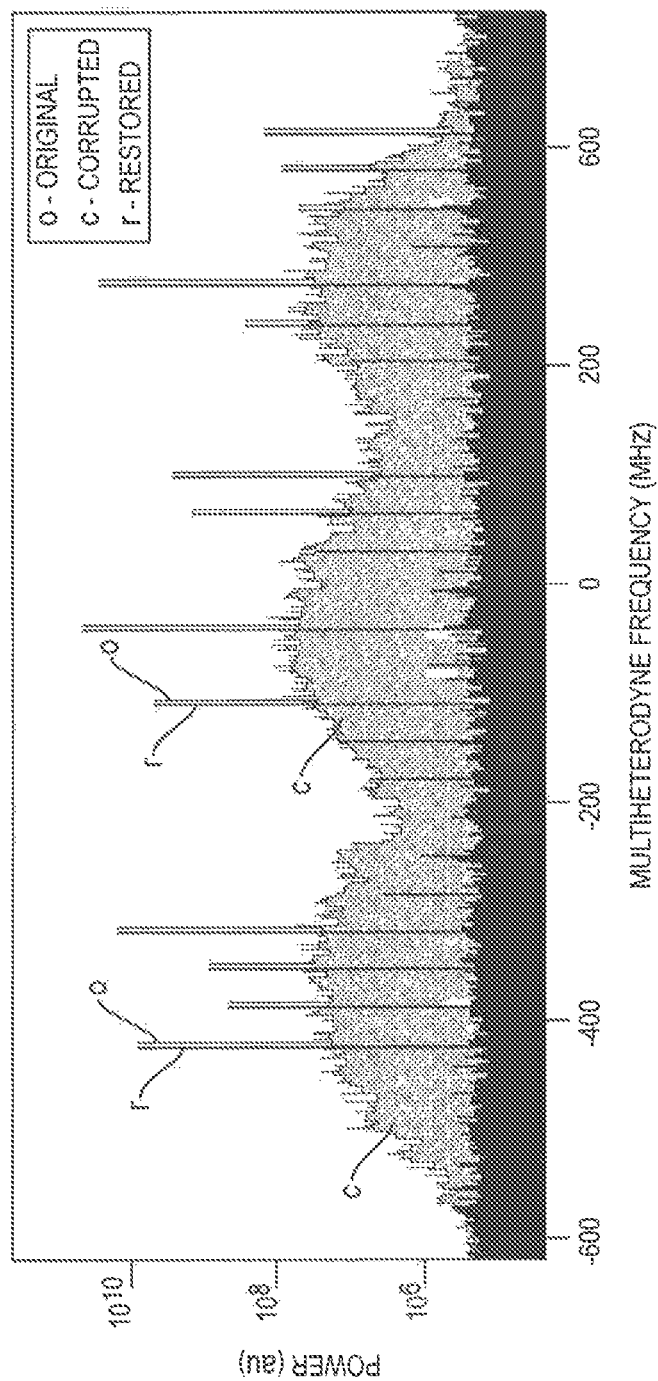
FIG. 14A shows plots of a simulated multiheterodyne signal, a simulated corrupted version of that signal due to phase and timing error, and a simulated restored version of that signal.
Figure 14B:
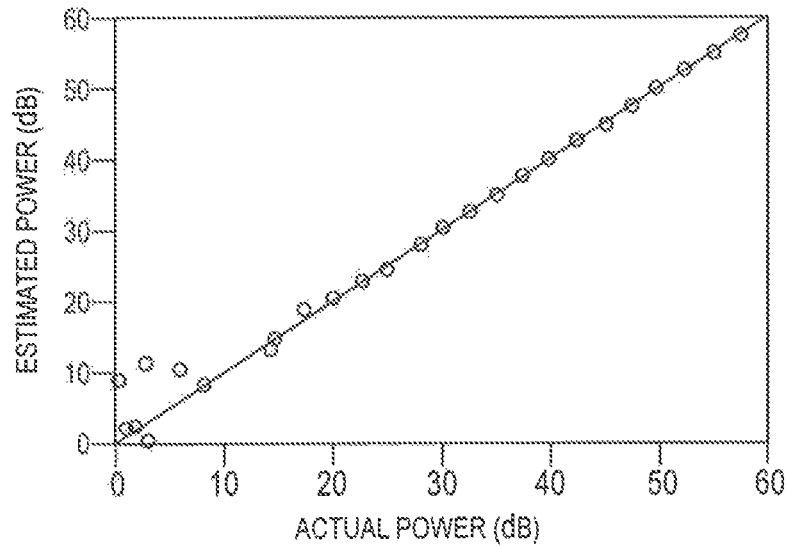
FIG. 14B shows a plot of estimated power of the simulated multi-heterodyne signal shown in FIG. 14A based on the restored signal relative to the actual power used to generate the original simulated signal.
Figure 14C:
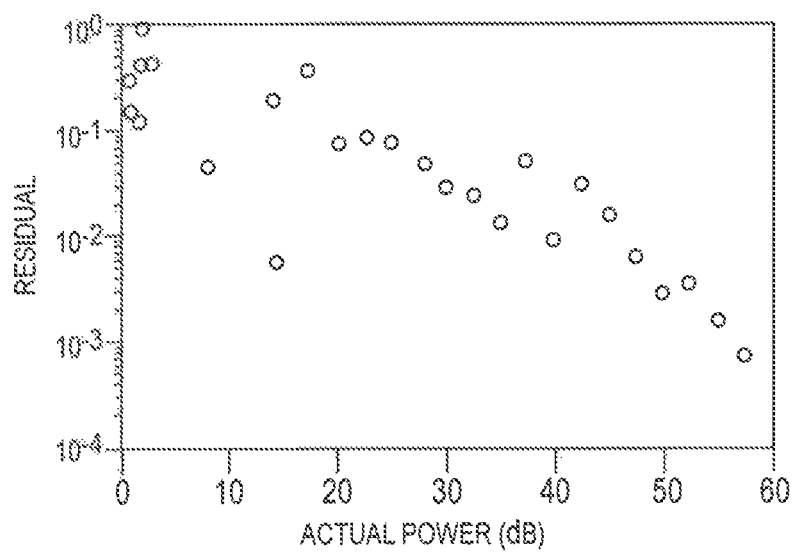
FIG. 14C shows a plot of residual error of the estimated power as a function of actual power shown in FIG. 14B.
Figure 14D:
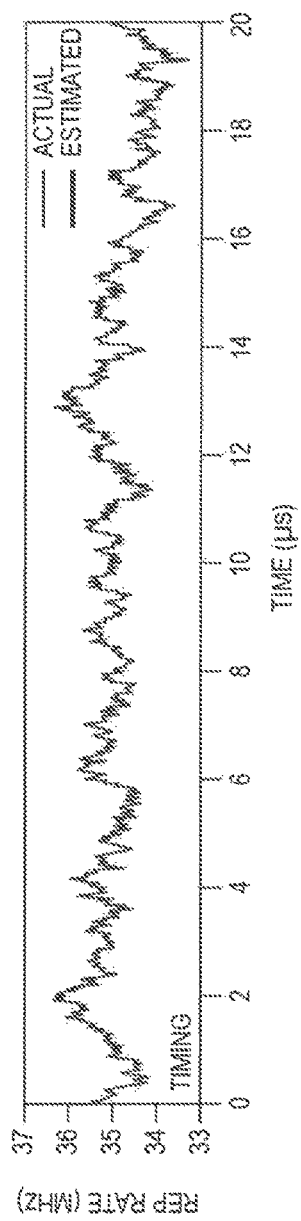
FIG. 14D shows a comparison of the timing error used to generate the corrupted multi-heterodyne signal shown in FIG. 14A relative to estimates of the timing error obtained via analysis of the corrupted signal.
Figure 14E:
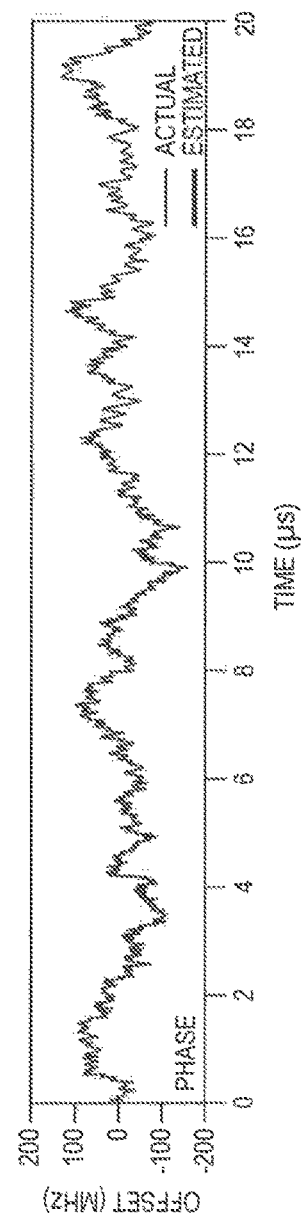
FIG. 14E shows a comparison of the phase error used to generate the corrupted multi-heterodyne signal shown in FIG. 14A relative to estimates of the phase error obtained via analysis of the corrupted signal.

In FIG. 14B, the power level of each line as determined by the correction procedure is plotted versus the actual power; good agreement is achieved between them (particularly at high signal levels). By plotting the fractional residual error between each line as shown in FIG. 14C, it can be seen the largest signals have errors under $10^{-3}$, with the error increasing for lines that are closer to the noise floor. Lastly, FIGS. 14D and 14C show a comparison between the actual corrupted signals with the estimated signals produced by the Kalman filter approach. Once again, good agreement was found between them.

Those having ordinary skill in the art will appreciate that various changes can be made to the above embodiments without departing from the scope of the invention. All publications referenced herein are hereby incorporated by reference in their entirety.

What is claimed is:

1. A multi-heterodyne system, comprising:
   a first laser source for generating multi-mode radiation having a frequency spectrum characterized by a first plurality of phase coherent frequencies,
   a second laser source for generating multi-mode radiation having a frequency spectrum characterized by a second plurality of phase coherent frequencies,
   at least one detector for detecting a combination of said multi-mode radiation generated by said first and second laser sources so as to provide a multi-heterodyne signal having a frequency spectrum characterized by a plurality of beat frequencies each beat frequency corresponding to a pairwise difference in said first and second plurality of phase coherent frequencies,
   an analyzer for receiving said multi-heterodyne signal and configured to employ a predictive model of said multi-heterodyne signal to provide estimates of any of phase error and timing error associated with said beat frequencies.

2. The system of claim 1, wherein said analyzer corrects any of said phase error and timing error of said detected multi-heterodyne signal based on said estimates so as to generate a corrected multi-heterodyne signal.

3. The multi-heterodyne system of claim 2, wherein said predictive model of said multi-heterodyne signal (y(t)) is defined as:

$$y(t) = \sum_n A_n e^{i2\pi \int f_n dt} = \sum_n r_n e^{i\varphi_n} e^{i2\pi \int f_n dt}$$

wherein,
$A_n$ denotes a complex amplitude associated with $n^{th}$ beat frequency characterized by a real amplitude $r_n$ and a phase $\varphi_n$,
$f_n$ denotes the frequency of the $n^{th}$ beat frequency.

4. The multi-heterodyne system of claim 3, wherein said analyzer minimizes an error function defined as:

$$J(x) = \sum_k \|y_k - h(x_k)\|^2_{R^{-1}} + \|x_k - f(x_{k-1})\|^2_{Q^{-1}}$$

wherein,
$x_k$ denotes a state of the system at time k,
$y_k$ denotes measurement of the multi-heterodyne signal at time k,
$h(x_k)$ denotes the measurement function h evaluated at state $x_k$ and defined as follows:
$h(x_k) = \sum_n A_{nk} e^{i2\pi\phi_{nk}} = \sum_n r_{nk} e^{i\varphi_{nk}} e^{i\phi_{nk}}$, wherein $A_{nk}$, $r_{nk}$, $\varphi_{nk}$, $\phi_{nk}$ denote, respectively, $A_n$, $r_n$, $\varphi_n$ and $\phi_n$ evaluated at time k,
$f(x_k)$ denotes the time evolution function $f$ evaluated at state $x_k$ such that:

$r_{n(k+1)} = r_{nk}$ $\varphi_{n(k+1)} = \varphi_{nk}$ $\phi_{n(k+1)} = \phi_{nk} + 2\pi \Delta t \, f_{nk}$ wherein $r_{n(k+1)}$, $\varphi_{n(k+1)}$, $\phi_{n(k+1)}$, denote, respectively, $r_n$, $\varphi_n$, and $\phi_n$ evaluated at time k+1,
R is said measurement noise covariance, and
Q is said process noise covariance.

5. The multi-heterodyne system of claim 1, wherein said analyzer is further configured to minimize an error function associated with a difference between said detected and said predicted multi-heterodyne signal to provide said estimated phase and timing errors.

6. The multi-heterodyne system of claim 5, wherein said error function comprises any of an extended Kalman filter, an unscented Kalman filter, and a particle filter.

7. The multi-heterodyne system of claim 5, wherein said predictive model of said multi-heterodyne signal (y(t)) is defined as:

$$y(t) = \sum_n A_n e^{i(\varphi_0 + n\Delta\varphi)} = \sum_n r_n e^{i\varphi_n} e^{i(\varphi_0 + n\Delta\varphi)}$$

wherein,
$A_n$ denotes a complex amplitude associated with $n^{th}$ beat frequency characterized by a real amplitude $r_n$ and a phase $\varphi_n$,
$\varphi_0$ denotes frequency offset phase between the multimode radiation from said first and second lasers and is defined as follows:

$$f_0 = \frac{1}{2\pi}\frac{d\varphi_0}{dt},$$

where $f_0$ denotes a time-dependent frequency offset between two lowest frequencies of said first and second plurality of frequencies,
$\Delta\varphi$ denotes repetition rate phase and is defined as follows:

$$\Delta f = \frac{1}{2\pi}\frac{d\Delta\varphi}{dt},$$

where $\Delta f$ denotes said repetition rate of said beat frequencies.

8. The multi-heterodyne system of claim 7, wherein said error function is defined as:

$$J(x) = \sum_k \|y_k - h(x_k)\|^2_{R^{-1}} + \|x_k - f(x_{k-1})\|^2_{Q^{-1}}$$

wherein,
$x_k$ denotes a state of the system at time k,
$y_k$ denotes measurement of the multi-heterodyne signal at time k,
$h(x_k)$ denotes measurement function h(x) evaluated at state $x_k$ as follows:
$h(x_k) = \sum_n A_{nk} e^{i(\varphi_{0k} + n\Delta\varphi_k)} = \sum_n r_{nk} e^{i\varphi_{nk}} e^{i(\varphi_{0k} + n\Delta\varphi_k)}$, wherein $A_{nk}, r_{nk}, \varphi_{nk}, \varphi_{0k}, \Delta\varphi_k$ denote, respectively, $A_n, r_n, \varphi_n, \varphi_0,$ and $\Delta\varphi$ evaluated at time k,
$f(x_k)$ denotes time evolution function $f(x)$ evaluated at state $x_k$ such that:

$r_{n(k+1)} = r_{nk}$ $\varphi_{n(k+1)} = \varphi_{nk}$ $\varphi_{0(k+1)} = \varphi_{0k} + 2\pi\Delta t\, f_{0k}$ $\Delta\varphi_{k+1} = \Delta\varphi_k + 2\pi\Delta t\, \Delta f_k$ wherein $r_{n(k+1)}, \varphi_{n(k+1)}, \varphi_{0(k+1)},$ and $\Delta\varphi_{k+1}$ denote, respectively, $r_n, \varphi_n, \varphi_0,$ and $\Delta\varphi$ evaluated at time k+1,
R is said measurement noise covariance,
Q is said process noise covariance.

9. The multi-heterodyne system of claim 1, wherein said frequency spectrum of any of said first and second pluralities of phase coherent frequencies spans a range of at least about 1 octave.

10. The multi-heterodyne system of claim 1, further comprising an optical combiner for receiving the radiation from said first and second lasers and generating a combined radiation beam directed to said at least one detector.

11. The multi-heterodyne system of claim 1, wherein at least one of said first and second lasers generates continuous-wave (CW) radiation.

12. The multi-heterodyne system of claim 1, wherein at least one of said first and second lasers generates pulsed radiation.

13. The multi-heterodyne system of claim 12, wherein at least one of said first and second lasers generates chirped pulsed radiation.

14. The multi-heterodyne system of claim 1, wherein at least one of said first and second lasers comprises a quantum cascade laser.

15. The multi-heterodyne system of claim 1, wherein at least one of said first and second laser sources comprises an infrared laser source.

16. The multi-heterodyne system of claim 1, wherein at least one of said first and second laser sources comprise a terahertz laser source.

17. The multi-heterodyne system of claim 1, wherein at least one of said first and second laser sources comprise a laser diode.

18. The multi-heterodyne system of claim 1, wherein the multimode radiation generated by each of said first and second laser sources comprises a frequency comb.

19. The multi-heterodyne system of claim 1, wherein said at least one detector comprises two detectors, each of said detector receiving a combination of the multi-mode radiation generated by said first and second laser sources to generate a multi-heterodyne signal, and wherein said analyzer operates on the multi-heterodyne signal associated with one of said detectors to generate said estimates of any of phase error and timing error and applies said estimates to multi-heterodyne signal generated by the other detector to generate a corrected multi-heterodyne signal.

20. The multi-heterodyne system of claim 1, wherein at least one of said laser sources comprises a micro-ring resonator.

21. The multi-heterodyne system of claim 20, wherein said micro-ring resonator generates a frequency comb.

22. A method for processing a multi-heterodyne signal comprising:
generating from a first laser source multi-mode radiation having a frequency spectrum characterized by a first plurality of phase coherent frequencies,
generating from a second laser source multi-mode radiation having a frequency spectrum characterized by a second plurality of phase coherent frequencies,
detecting a combination of said multi-mode radiation generated by said first and second laser sources so as to provide a multi-heterodyne signal having a frequency spectrum characterized by a plurality of beat frequencies, each beat frequency corresponding to a pairwise difference between said first and second plurality of phase coherent frequencies, and
employing a predictive model of said multi-heterodyne signal to provide estimates of any of phase error and timing error associated with said beat frequencies.

23. The method of claim 22, further comprising correcting any of said phase error and timing error of said detected multi-heterodyne signal based on said estimates so as to generate a corrected multi-heterodyne signal.

24. The method of claim 22, further comprising minimizing an error function associated with a difference between said detected and said predicted multi-heterodyne signal to provide said estimated phase and timing errors.

25. The method of claim 24, further comprising using any of an extended Kalman filter, an unscented Kalman filter, and a particle filter to minimize the error function.

26. The method of claim 22, wherein said predictive model of said multi-heterodyne signal is defined as:

$$y(t) = \sum_n A_n e^{i(\varphi_0 + n\Delta\varphi)} = \sum_n r_n e^{i\varphi_n} e^{i(\varphi_0 + n\Delta\varphi)}$$

wherein,
$A_n$ denotes a complex amplitude associated with $n^{th}$ beat frequency characterized by a real amplitude $r_n$ and a phase $\varphi_n$,
$\varphi_0$ denotes frequency offset phase and is defined as follows:

$$f_0 = \frac{1}{2\pi} \frac{d\varphi_0}{dt},$$

where $f_0$ denotes a time-dependent frequency offset between two lowest frequencies of said first and second plurality of frequencies,
$\Delta\varphi$ denotes repetition rate phase and is defined as follows:

$$\Delta f \frac{1}{2\pi} \frac{d\Delta\varphi}{dt},$$

where $\lambda f$ denotes said repetition rate of said beat frequencies.

27. The method of claim 22, further comprising combining the multi-mode radiation generated by said first and second lasers to generate a combined beam for detection by said detector.

28. The method of claim 22, wherein at least one of said first and second lasers generates continuous-wave (CW) radiation.

29. The method of claim 22, wherein at least one of said first and second laser sources generates pulsed radiation.

30. The method of claim 22, wherein at least one of said first and second laser sources comprises a quantum cascade laser.

31. The method of claim 22, wherein at least one of said first and second laser sources comprises a infrared laser source.

32. The method of claim 22, wherein at least one of said first and second laser sources comprises a terahertz laser source.

33. A multi-heterodyne spectrometer comprising:
a first laser source for generating multi-mode radiation having a frequency spectrum characterized by a first plurality of phase coherent frequencies,
a second laser source for generating multi-mode radiation having a frequency spectrum characterized by a second plurality of phase coherent frequencies,
a sample holder arranged such that the multi-mode radiation generated by at least one of said first and second laser sources passes through said sample holder so as to interact with a sample contained therein,
at least one detector for detecting a combination of the multimode radiation generated by said first and second lasers, wherein the combination includes at least one multimode radiation having passed through the sample holder, so as to generate a multi-heterodyne signal having a frequency spectrum characterized by a plurality of beat frequencies, each beat frequency corresponding to a pairwise difference between said first and second plurality of phase coherent frequencies, and
an analyzer for receiving said multi-heterodyne signal and configured to employ a predictive model of said multi-heterodyne signal to provide estimates of any of phase error and timing error associated with said beat frequencies.

34. The multi-heterodyne spectrometer of claim 33, wherein said analyzer corrects any of said phase error and timing error of said detected multi-heterodyne signal based on said estimates so as to generate a corrected multi-heterodyne signal.

35. The multi-heterodyne spectrometer of claim 34, wherein said analyzer determines at least one property of said sample based on an analysis of said corrected multi-heterodyne signal.

* * * * *

UNITED STATES PATENT AND TRADEMARK OFFICE
CERTIFICATE OF CORRECTION

PATENT NO. : 10,126,170 B2
APPLICATION NO. : 15/259687
DATED : November 13, 2018
INVENTOR(S) : David Burghoff et al.

Page 1 of 1

It is certified that error appears in the above-identified patent and that said Letters Patent is hereby corrected as shown below:

In the Specification

At Column 1, Lines 13-15, please replace the Government Support paragraph, with the following paragraph:
GOVERNMENT SUPPORT
This invention was made with Government support under Grant No. ECCS1505733 awarded by the National Science Foundation (NSF), and Grant No. W31P4Q-16-1-0001 awarded by the U.S. Army. The Government has certain rights in the invention.

Signed and Sealed this
Thirty-first Day of March, 2020

Andrei Iancu
*Director of the United States Patent and Trademark Office*